Inventor
CLARENCE J. SCHILLING

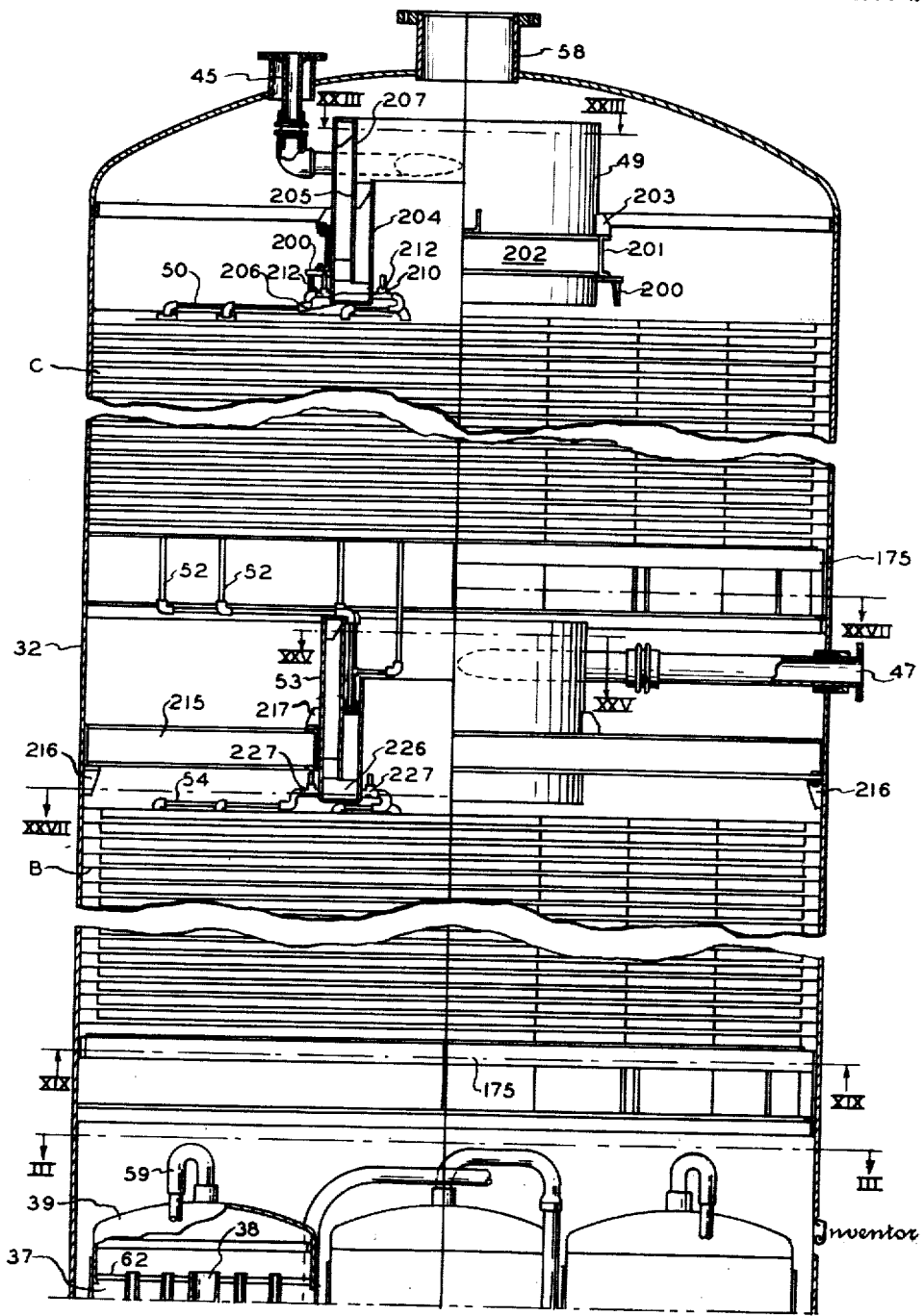

Aug. 27, 1957     C. J. SCHILLING     2,804,292
GAS-LIQUID CONTACT APPARATUS
Filed Oct. 21, 1952     14 Sheets-Sheet 4

*INVENTOR.*
CLARENCE J. SCHILLING
BY
ATTORNEY

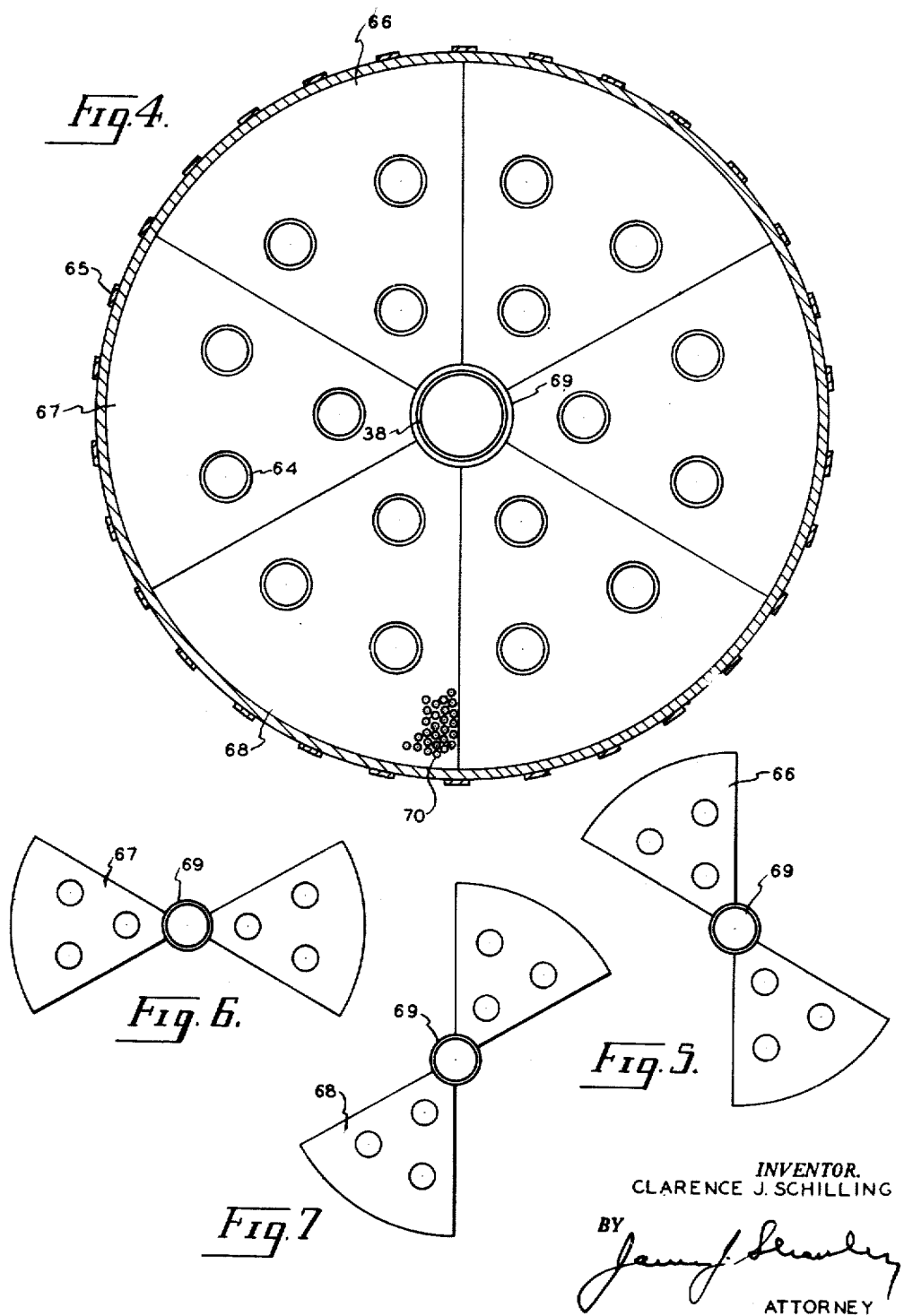

INVENTOR.
CLARENCE J. SCHILLING
BY
ATTORNEY

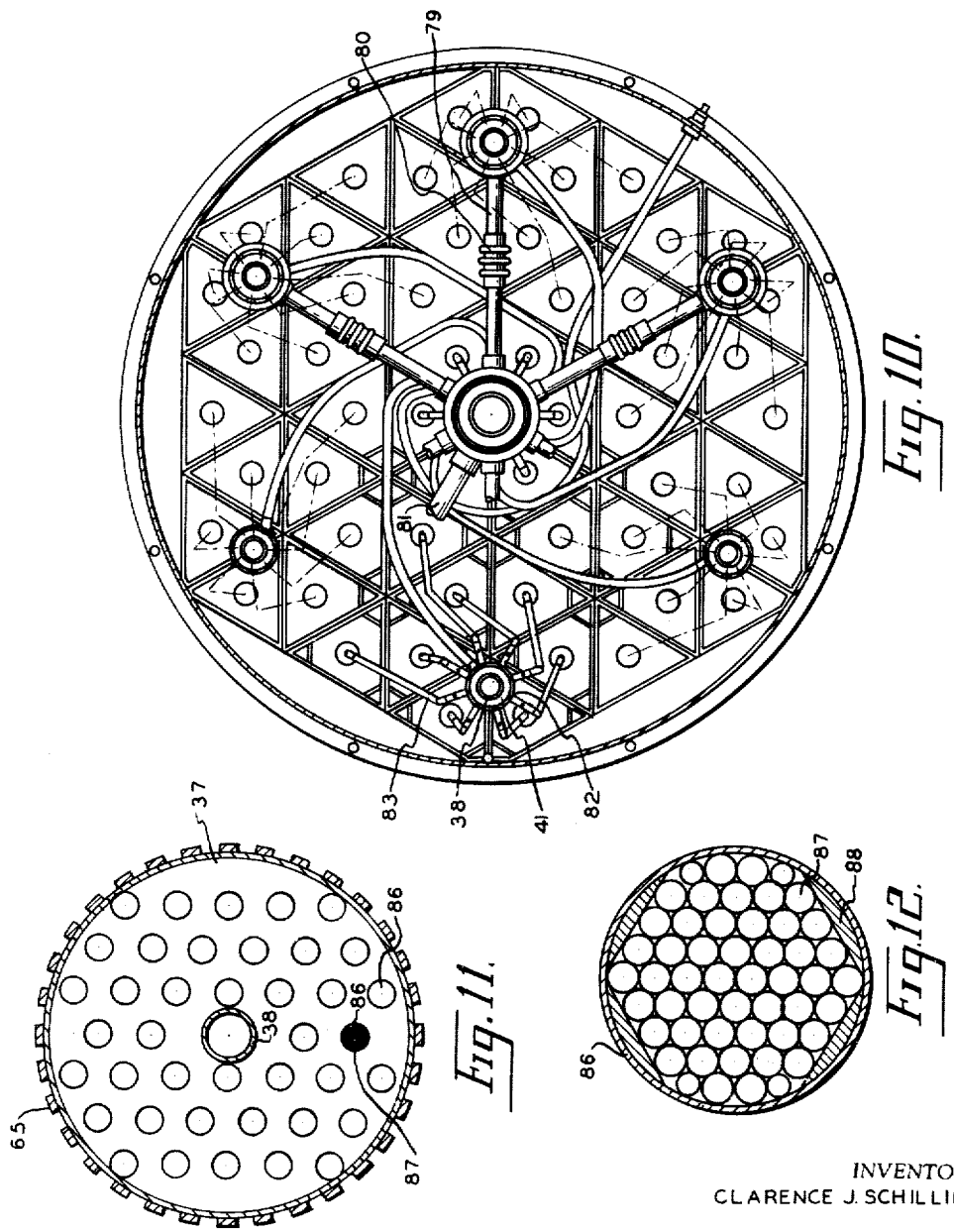

Aug. 27, 1957     C. J. SCHILLING     2,804,292
GAS-LIQUID CONTACT APPARATUS
Filed Oct. 21, 1952     14 Sheets-Sheet 8

INVENTOR
CLARENCE J. SCHILLING
BY *[signature]*
ATTORNEY

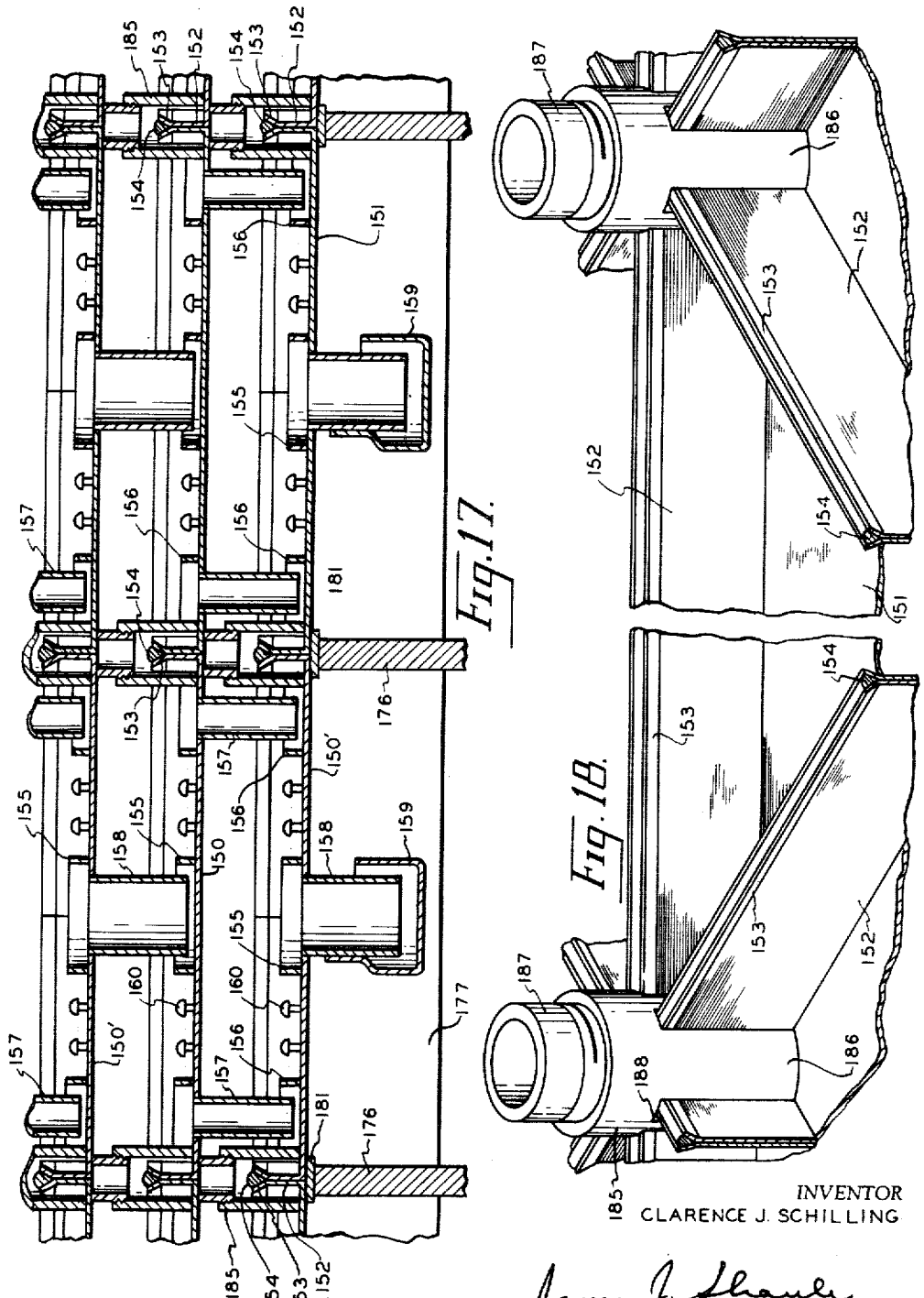

Aug. 27, 1957  C. J. SCHILLING  2,804,292
GAS-LIQUID CONTACT APPARATUS
Filed Oct. 21, 1952  14 Sheets-Sheet 10

INVENTOR.
CLARENCE J. SCHILLING
BY

Aug. 27, 1957  C. J. SCHILLING  2,804,292
GAS-LIQUID CONTACT APPARATUS
Filed Oct. 21, 1952  14 Sheets-Sheet 11

INVENTOR.
CLARENCE J. SCHILLING
BY

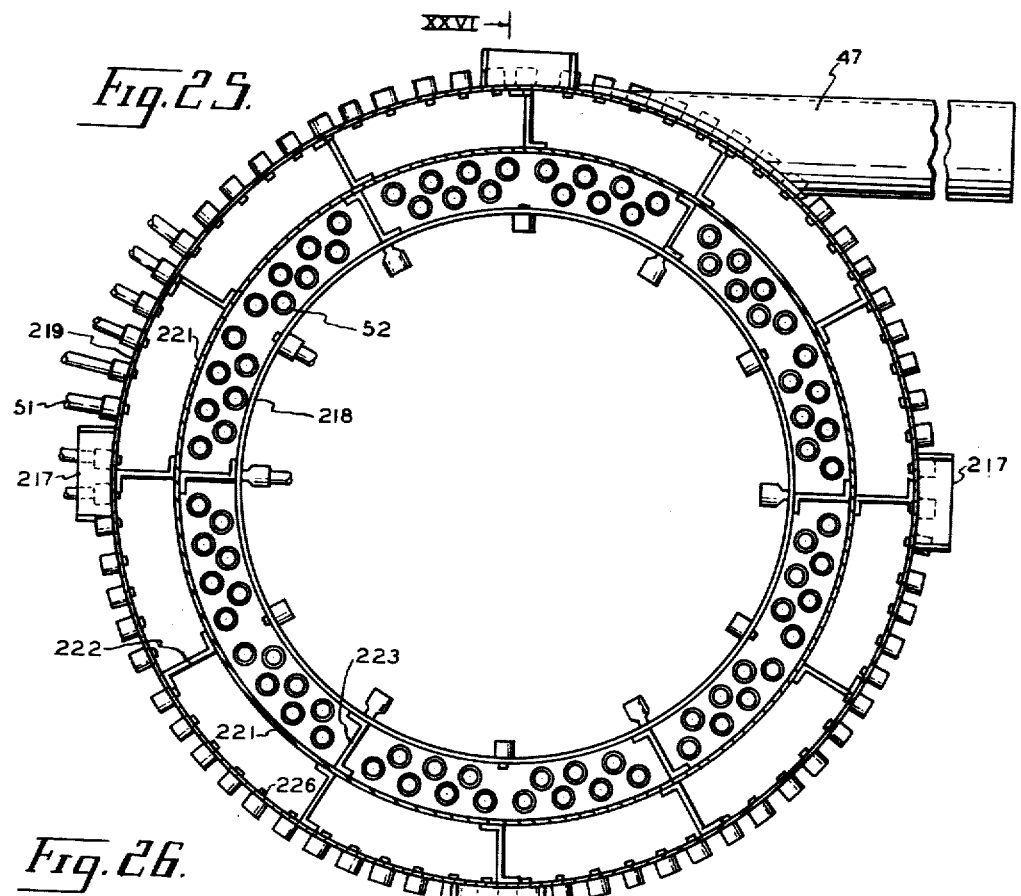
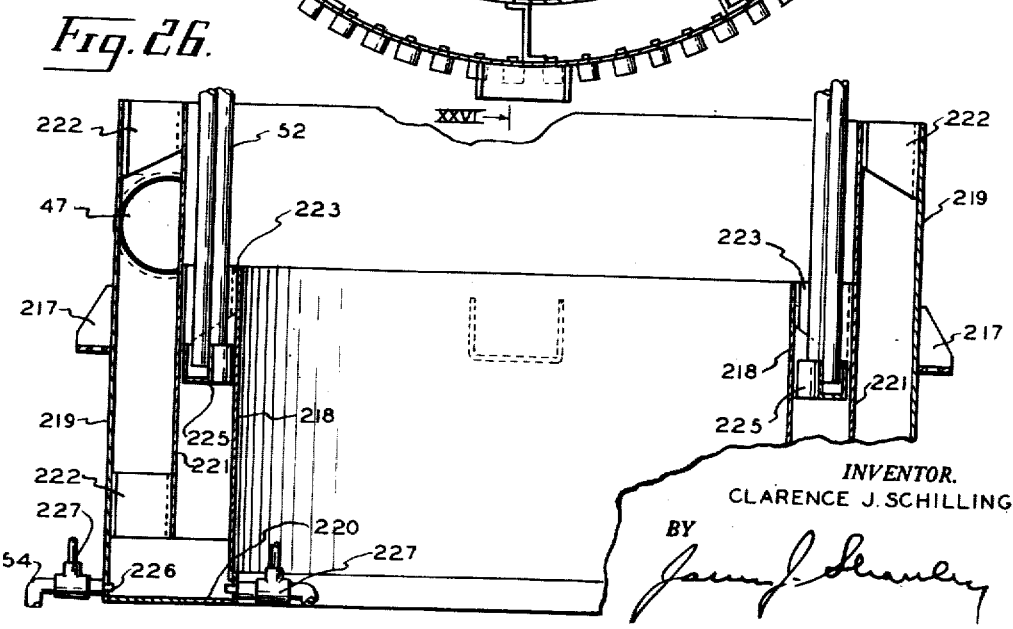

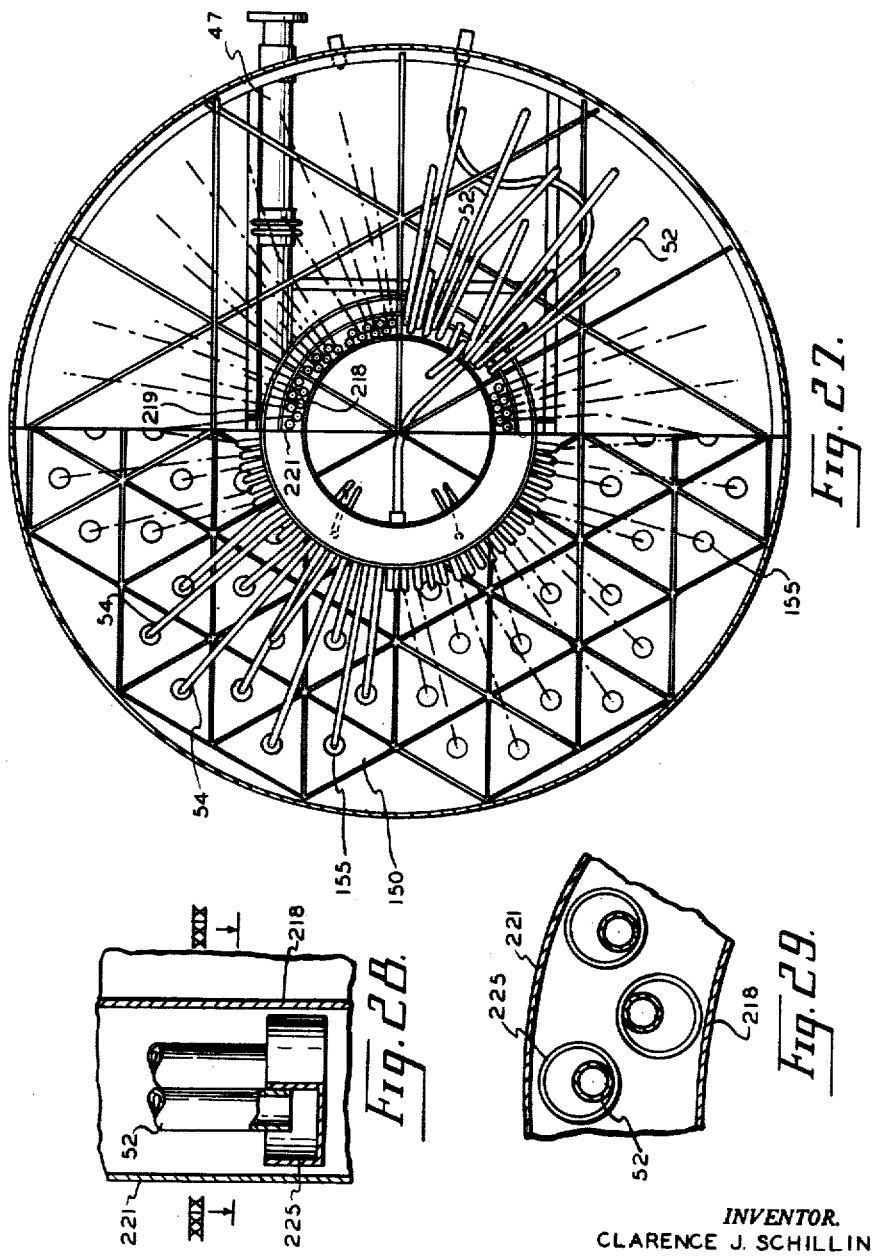

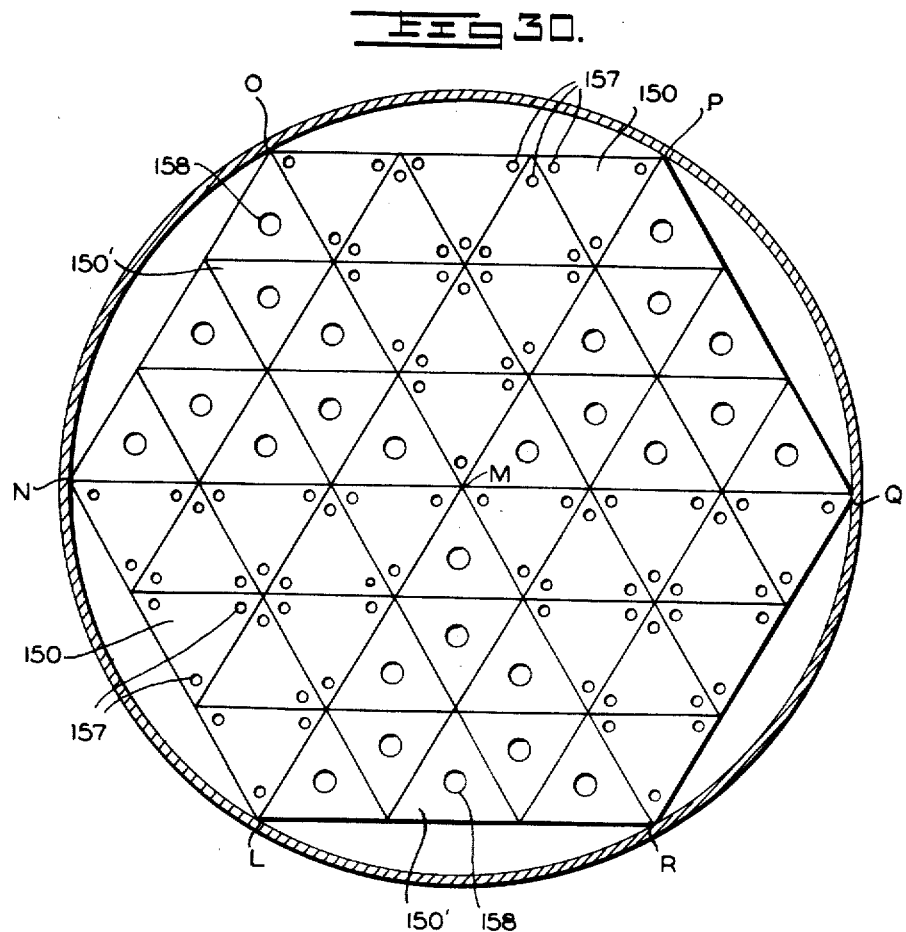

United States Patent Office 2,804,292
Patented Aug. 27, 1957

2,804,292

GAS-LIQUID CONTACT APPARATUS

Clarence J. Schilling, Allentown, Pa., assignor to Air Products Incorporated, a corporation of Michigan Application October 21, 1952, Serial No. 315,955

9 Claims. (Cl. 261—114)

This invention relates to improvements in apparatus for rectification, fractionation or distillation.

While the apparatus of the invention is especially suitable for use in the separation of oxygen from the atmosphere and is so described, it may be utilized for any gas-liquid contact operation.

In the low-temperature separation of air as customarily practiced, the air is prepared for separation by compressing it to a relatively high pressure, and cooling it to a very low temperature by heat exchange with the gaseous products of the separation. The moisture and carbon dioxide in the air are removed either by chemical adsorption prior to the cooling or by solidification and re-evaporation during the cooling in reversing countercurrent heat interchangers. Such cooled and partially liquefied air is expanded to a lower pressure and is passed into a rectifying column which may consist of one or two stages of rectification. A cold gaseous nitrogen product is withdrawn from the upper portion of the rectifying column and is passed through a countercurrent heat interchanger to cool the incoming air. The oxygen product of rectification which is at a relatively low pressure may be removed as a gas or a liquid product; and to recover the refrigeration therefrom, the oxygen product is also passed through a countercurrent heat interchanger to cool the incoming air. A separate heat interchanger may be provided for the oxygen product and for the nitrogen product or a single multi-passageway interchanger may be provided for both the oxygen and the nitrogen products. The oxygen product may be collected as a gas at atmospheric temperature and pressure as it passes from the heat interchanger, or the oxygen may be pumped in the liquid state to a relatively high pressure prior to passing through the heat interchanger, and may then be collected as a gas at a high pressure after the heat interchange step.

The present invention relates to fractionating column structure especially suitable for the operation described above, and more particularly to two-stage fractionating column structure of very large capacity which is designed to produce hundreds of tons per day of oxygen of approximately 90–95% purity with argon and a small amount of nitrogen as the principal impurities. Important features of the invention are likewise applicable to single stage fractionating column structures.

The columns heretofore constructed for the production of oxygen by air fractionation have been of the relatively small size adapted to small demands for the product. A requirement is now arising for oxygen in very large quantities for use in steel mills, the chemical industries and the like. For manufacturing oxygen in such large quantities, the columns of conventional construction are not satisfactory.

In the conventional rectification column employed in the separation of the constituents of gaseous mixtures following liquefaction thereof, a plurality of trays are arranged in the column, each provided with a plurality of vapor risers and bubble caps and with downflows disposed to establish the liquid level on the trays and to permit liquid to flow downwardly from tray to tray. The vapor traveling through the risers and under the bubble caps bubbles through the liquid on the trays with the result that the vapor becomes enriched in the lower boiling fraction while the higher boiling fraction accumulates in the liquid flowing over the trays.

In the conventional form of these columns the reflux liquid flows across the plates. In columns even of small diameter and having a correspondingly small number of caps per plate, much difficulty is experienced in producing even flow and distribution of the reflux liquid, without which the highest efficiency cannot be attained. As the diameter of the plate increases, the efficiency of the plate tends to decrease, by reason of less satisfactory liquid distribution over its area. If for any reason, as for example, buckling of the plate or settling of the column, the plate departs from a horizontal plane, its efficiency falls off very rapidly and with large diameter columns the plate becomes nonfunctional when the departure from horizontal is only a few degrees. Further, in very large columns, the plates usually employed have an efficiency somewhat lower than those in smaller units, because of the hydraulic gradient needed to cause the liquid to flow at the necessary velocity across the larger dimensions involved. This results in differences in liquid depth disadvantageously greater in the upstream than in the downstream portions of the plate. Through the employment of the invention herein described, each plate may be readily and efficiently assembled from sections of such dimensions and shape as to avoid the objectionable differences in depth described above.

In two-stage columns, it has been conventional to provide a single condenser for use between the high pressure and the low pressure sections of the fractionating column. In the fractionation of air, the purpose of the condenser is to condense the nitrogen vapor rising in the high pressure section of the column by heat interchange with the boiling liquid oxygen which collects around the condenser in the low pressure section of the column. This condensate is used as reflux liquid for both stages of the column. As shown in the prior art, these condensers consist of a bundle of vertical tubes projected upwardly from a tube sheet separating the column sections, the upper ends of the tubes being retained in a second tube sheet surmounted by a domed head. A vapor tight unit is thus formed which is partly or entirely submerged in liquid oxygen boiling in the base of the low pressure section, the tubes being supplied with high pressure nitrogen vapor which is condensed therein. A portion of the condensed liquid is passed into the high pressure section of the column as reflux and the balance of the condensed liquid is withdrawn from the high pressure section of the column, expanded and passed into the upper end of the low pressure section to serve as reflux there.

No difficulty has been experienced in constructing such condensers in the sizes heretofore demanded, but in the construction of unitary condensers for the large capacity columns now coming into use, almost insuperable difficulties are encountered. The condenser unit becomes unwieldy due to the extremely large diameter of the tube sheets and the domed head, the enormous number of small diameter tubes required and the impossibility of testing the unit for tightness until the entire assembly has been positioned in the column shell. These difficulties are avoided in this invention, the salient features of which include, the apportionment of the condensing surface between a plurality of condensing units operating in parallel, cross connected for equalization and of such individual size that they may be assembled and tested prior to mounting in the column.

In constructing fractionating columns having a diameter in the neighborhood of ten feet and over, a number of additional problems arise with respect to the fractionating plates, such as the leveling of the plates, the protection of the plates against the possibility of distortion, the shipment of plates of such diameters, the prevention of channeling of the liquids and vapors so as to obtain good liquid-vapor contact, the proper distribution of the liquids to all parts of the plates, and a number of others. In the construction of plates of such large size, it has been found that the cost of such columns may be greatly reduced and other important advantages gained by the use of fractionating plates so designed that they may be assembled in the field by assembling a large number of relatively small parts, each of which may be fabricated rapidly in the shop.

The resulting column provides for the accurate distribution of liquid feed over the area of the plate and for collecting and redistributing liquids refluxing from one stack of plates onto the uppermost plate of the stack next below.

This invention has an object to provide a fractionating column of very large capacity and of great diameter, yet having a high efficiency, which solves the problems due to large size mentioned above.

A further object is to provide a multiple condenser structure of relatively simple construction for use between the high pressure and the low pressure sections of two-stage columns.

A still further object of the invention is to provide a new and improved construction of gas-liquid contact plate for use in such large columns, and an improved support for these plates.

Another object is to provide a simple means and method for assembling and leveling the bubble plates of a column at the point of installation.

Another object of the invention is to provide for the accurate distribution of liquid feed over the area of a plate.

Another object is to provide means for collecting and redistributing liquid reflux between stacks of plates in a column.

Another object is to provide means for collecting reflux between stacks of plates in a column, mixing the reflux with another liquid admitted to the column at that point, and redistributing the mixture to the stack of plates below.

These and other objects, which will appear hereinafter, are accomplished by the present invention which is described hereafter.

The invention may best be understood with reference to the attached drawings and the following description thereof, in which:

Figures 2A and 2B are views in vertical section through such a column embodying the present invention, Figure 2B being a continuation of Figure 2A showing the lower portion of the column;

Figure 4 is a horizontal sectional view of one of the condensers along line IV—IV of Figure 2B;

Figure 2B:
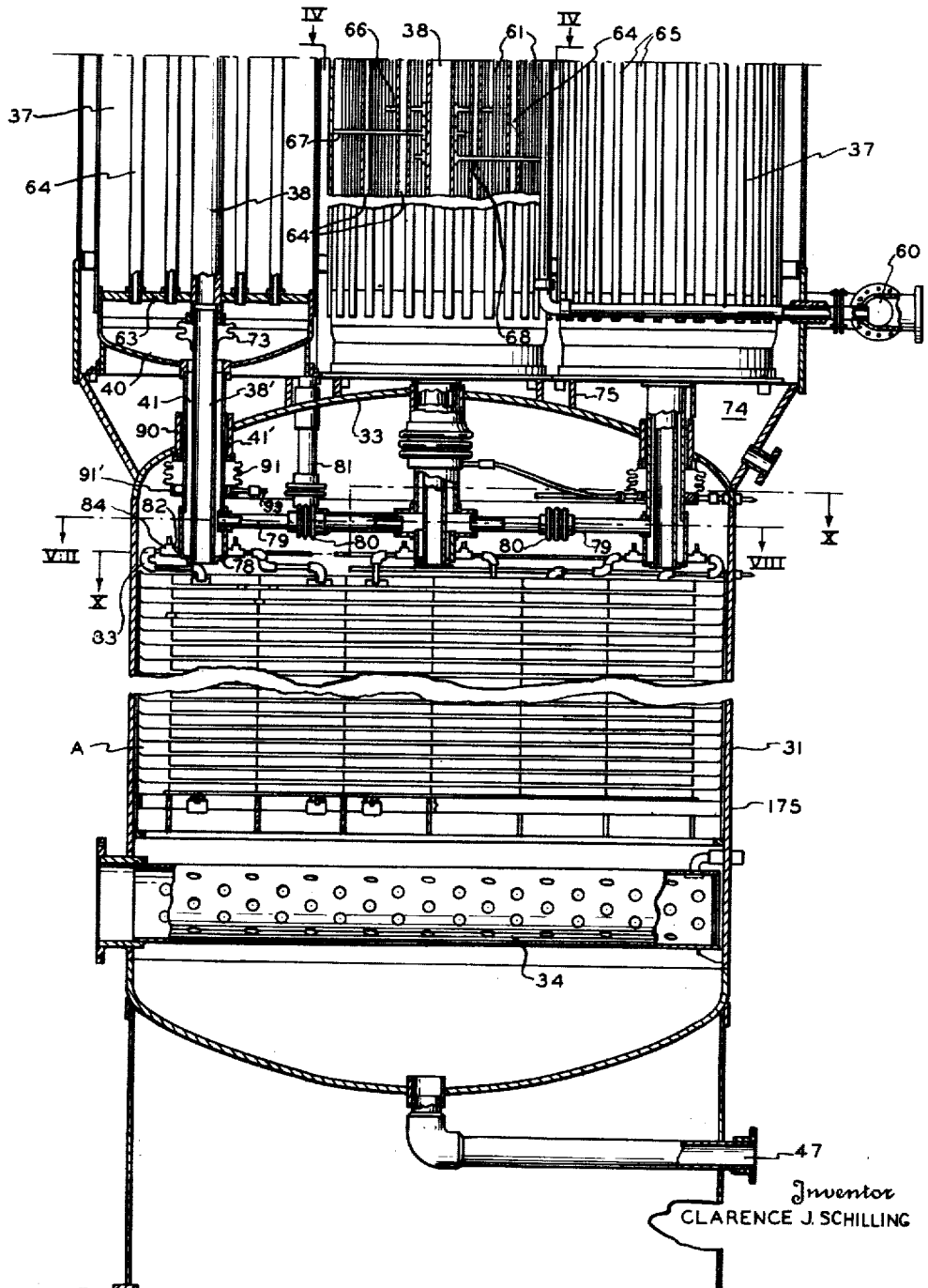
Figure 8:
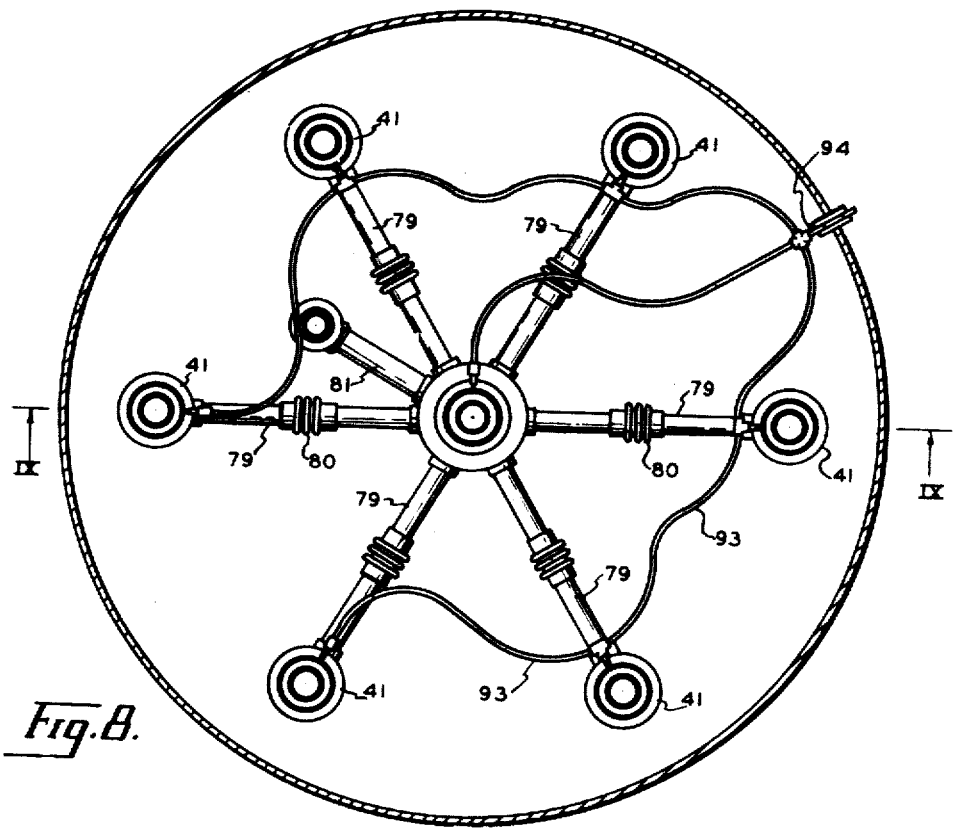
Figure 9:
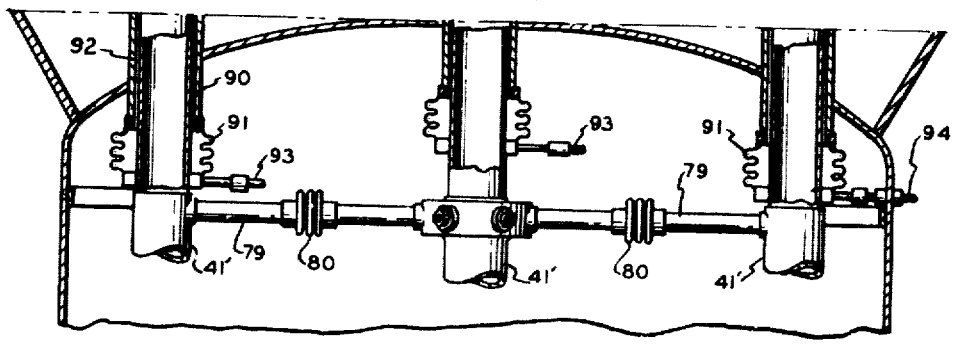
Figure 13:
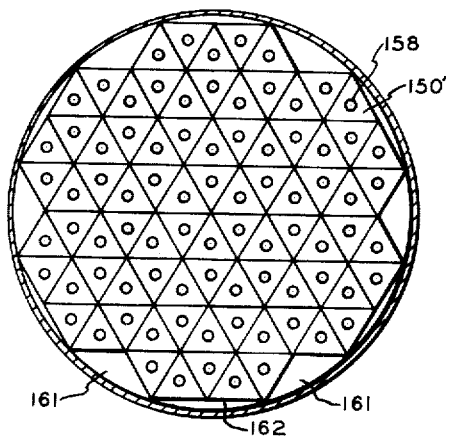
Figure 14:
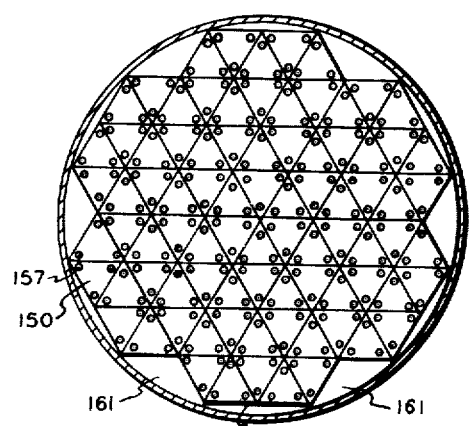
Figure 15:
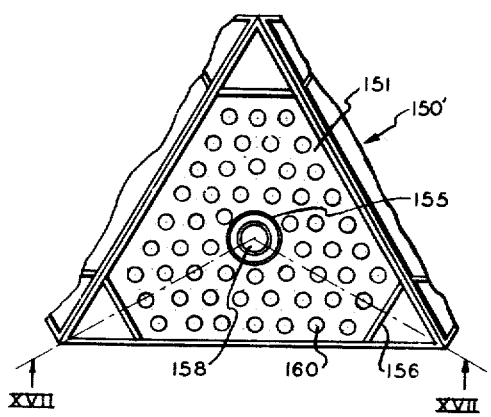
Figure 16:
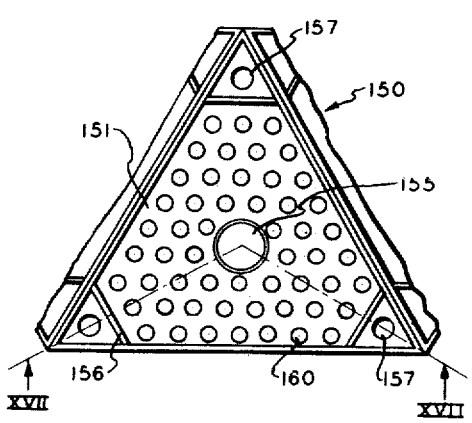
Figure 19:
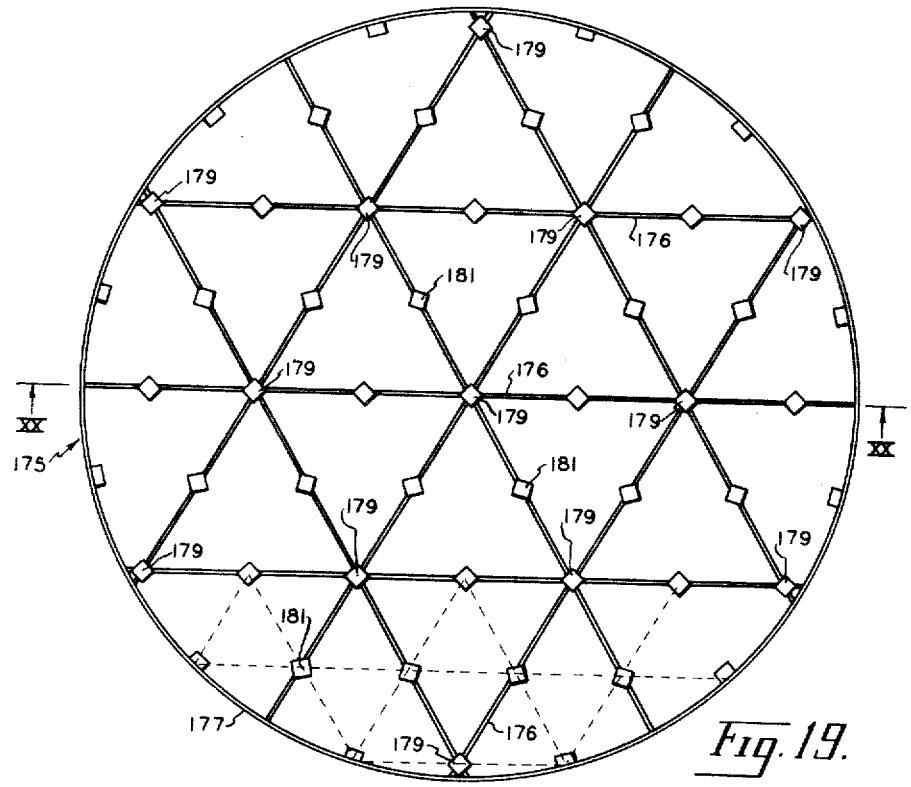
Figure 20:
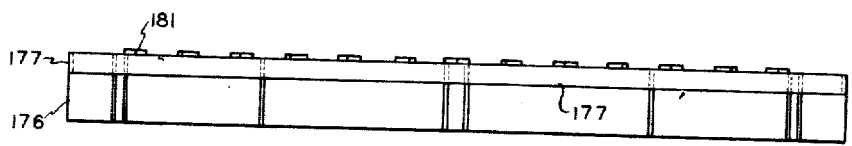
Figure 21:
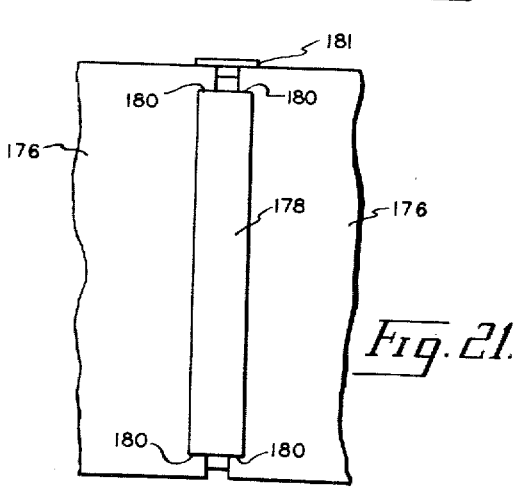
Figure 22:
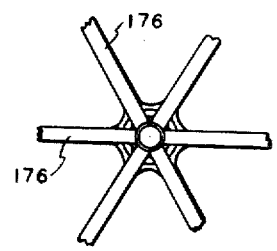
Figure 23:
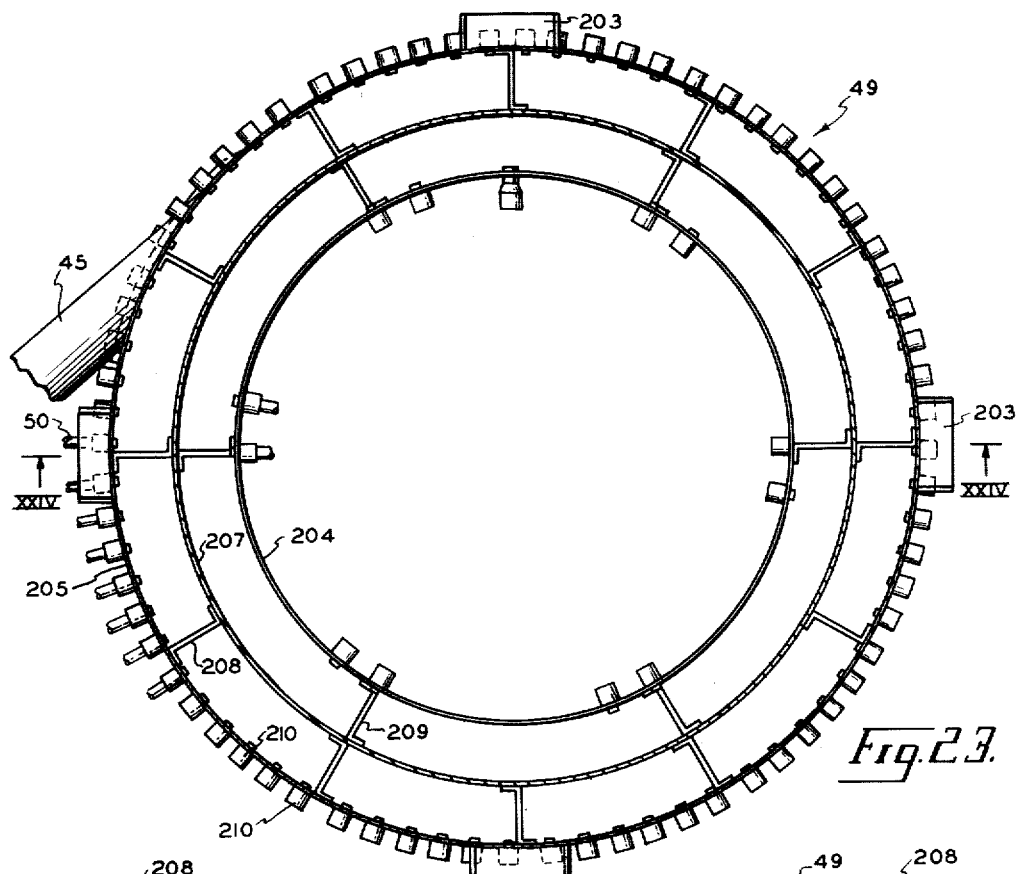
Figure 24:
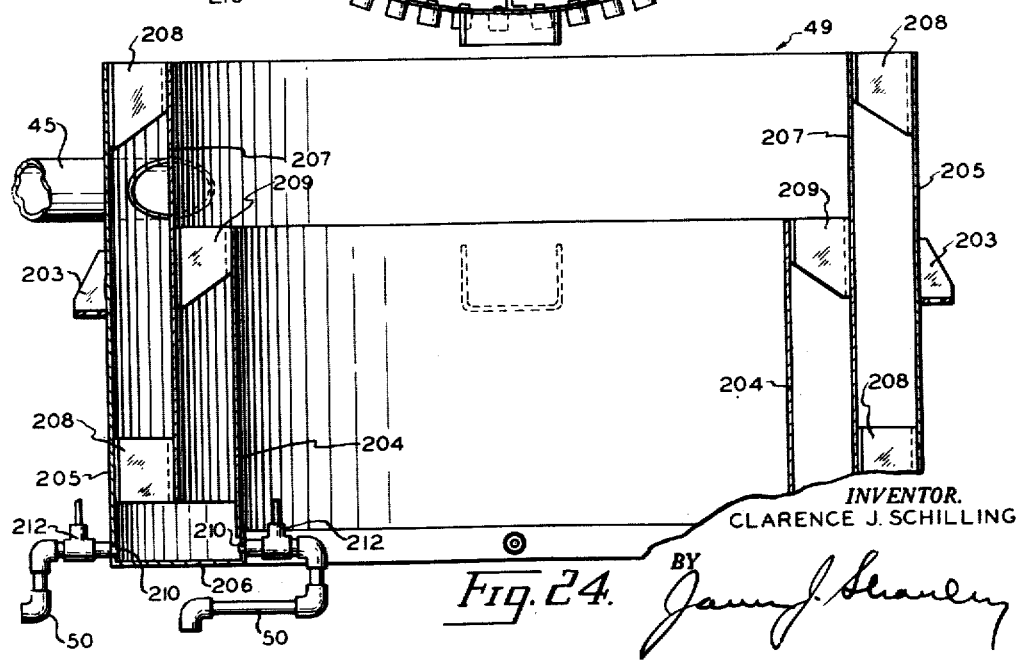

Figures 5–7, inclusive, are views showing the baffles in the condensers;

Figure 8 is a horizontal sectional view through the column along the line VIII—VIII of Figure 2B;

Figure 9 is a view taken along the line IX—IX of Figure 8;

Figure 10 is a horizontal sectional view through the column along the line X—X of Figure 2B;

Figure 11 is a cross-section through a modified form of condensing unit, not shown;

Figure 12 is a cross-section on a larger scale through one of the tubes of the condensing unit of Figure 11;

Figure 13 is a diagrammatic horizontal sectional view through the column showing one of the plates having central downcomers;

Figure 14 is a diagrammatic horizontal sectional view through the column showing one of the plates having corner downcomers;

Figure 15 is a plan view of one of the fractionating wells of Figure 13;

Figure 16 is a plan view of one of the fractionating wells of Figure 14;
ofodletepaGatfilaDfi a,. T vinsio Figure 17 is a section through three of the bottom plates of a stack, the section through each well being along a line such as XVII—XVII of Figures 15 and 16;

Figure 18 is a perspective view of a portion of a fractionating plate showing the spacers at the points of intersection of the fractionating wells;

Figure 19 is a horizontal sectional view through the column along line XIX—XIX of Figure 2A showing the grid arrangement;

Figure 20 is a view taken along the line XX—XX of Figure 19;

Figures 21 and 22 are details showing the methods of joining the grid bar members;

Figure 23 is a plan view of the distributor at the top of the low pressure section of the column taken along the line XXIII—XXIII of Figure 2A;

Figure 24 is a sectional view taken along the line XXIV—XXIV of Figure 23;

Figure 25 is a plan view of the collector-distributor located at an intermediate point in the low pressure section of the column taken along the line XXV—XXV of Figure 2A, the cups at the bottom of tubes 52 being omitted;

Figure 26 is a sectional view taken along the line XXVI—XXVI of Figure 25;

Figure 27 is a horizontal sectional view through the column along the line XXVII—XXVII of Figure 2A;

Figure 28 is an enlarged detail view showing the method of attaching the cups to the bottoms of the tubes 52;

Figure 29 is a section along the line XXIX—XXIX of Figure 28, and

Figure 30 is a view in section through the column showing a plan view of a plate constructed in accordance with another embodiment of the present invention.

To simplify the description of the invention shown in the drawings, the following specification has been divided into a number of sections describing important features of the invention.

*Column operation in general*

Figure 1:
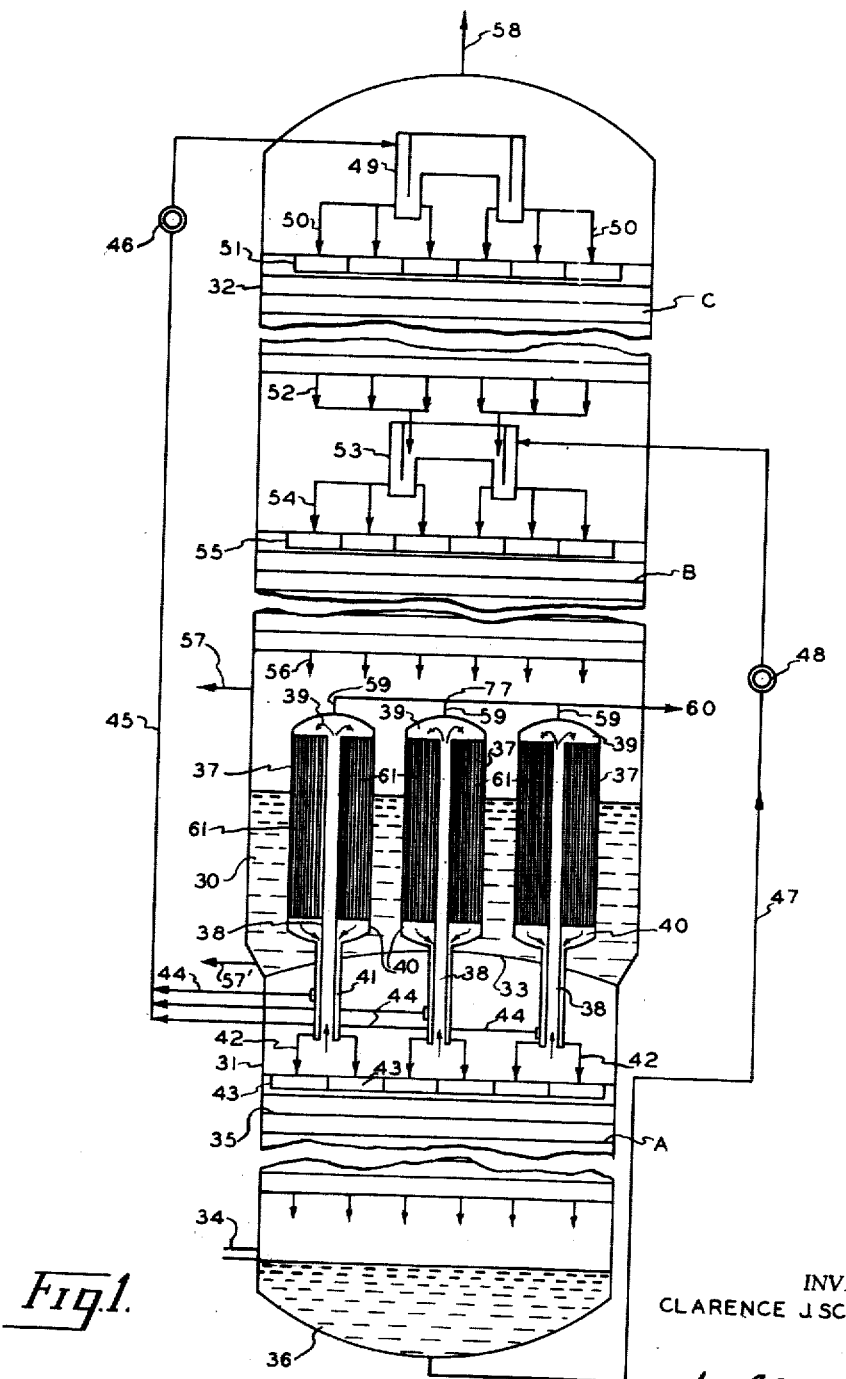
Figure 1 is a diagrammatic view of a complete two-stage column illustrative of the environment of the present invention and of certain features of the same.

Referring to Figure 1, a two-stage fractionating column is shown which is suitable for the fractionation of air although its use is not limited thereto. The column consists of a high pressure section 31 and a low pressure section 32 separated by a curved partition plate 33. An inlet conduit 34 is provided to the high pressure section for the admission of compressed air which has been previously purged of high boiling point impurities and has been cooled by interchange with the outgoing products of the fractionation. The high pressure section of the column 31 contains a stack of fractionation plates 35 designated as A which are of unique design and will be described hereafter in more detail. In general, the fractionating plates 35 are made up of a plurality of wells, each of which is provided with one or more downcomers for the reflux liquid and a plurality of bubble caps for permitting the vapors rising in the column to bubble through the liquid in each well. The liquid flowing downwardly through each downcomer flows into a well directly beneath in the plate below. In this manner, the streams of reflux liquid flowing downwardly through vertical series of wells are maintained separate throughout the high pressure section of the column and finally are collected as a pool 36 in the base of the high pressure section of the column. The vapors rising through the column on the other hand are permitted to intermingle between each plate, passing through the bubble caps on each plate and finally collecting at the top of the high pressure section of the column.

A plural condenser arrangement 37 is provided in the base of the low pressure section. Although any number may be used, seven condensers are shown in the drawings, one in the center of the column and the remaining six surrounding it. Each of the condensers 37 is provided with a central vapor tube 38 and pipe 38' which extend through the partition 33 into communication with the upper portion of the high pressure section of the column. The vapors collecting in the upper portion of the high pressure section of the column pass upwardly through the central vapor tubes 38 into the chambers 39 provided at the top of the condensers and thence flow downwardly through a plurality of small tubes which connect the upper chambers 39 of the condensers with the lower chambers 40 thereof. In flowing downwardly from the chamber 39 to the chamber 40 through the small tubes, the gases are condensed by heat interchange with a pool of liquid 30 which has collected in the base of the low pressure section of the column 32 and surrounds at least the lower end of the condensers. An annular passageway 41 is formed by a tubular structure 41' surrounding the pipe 38' to each condenser extending downwardly from the lower chamber 40 and through the partition plate 33. The condensate collecting in each chamber 40 flows downwardly through the annular passageway 41 which has a closed bottom and collects as a pool therein. A plurality of orifices are provided in the wall of the tubular structure 41' at its lower end to permit the flow of a portion of the condensate therefrom in a plurality of streams of equal volume. These streams are indicated on the drawing by the numerals 42. Each stream 42 flows to a separate well 43 on the top plate of the stack of fractionating plates in the high pressure section of the column. A portion of the condensate collecting in each annular passageway 41 is drawn off through line 44, and the portions from each condenser are combined into a single stream flowing in conduit 45 which leads to the upper portion of the low pressure section of the column. An expansion valve 46 is provided in the line 45 to expand the stream of liquid flowing therein from the high pressure at which the high pressure section of the column is maintained to the lower pressure maintained in the low pressure section of the column. A conduit 47 is likewise provided for conducting a stream of the liquid in the pool 36 at the bottom of the high pressure section of the column to an intermediate point in the low pressure section of the column. An expansion valve 48 is similarly provided in line 47 to provide for expansion of the stream of liquid flowing therein.

The liquid flowing in conduit 45 discharges into a distributing device 49 in the upper end of the low pressure section of the column, in which it is subdivided into a plurality of equal streams 50, each of which flows to an individual well on the top plate of the stack of plates C in the upper portion of the low pressure section of the column. These wells are indicated by the numeral 51. The streams of reflux liquid flow downwardly from plate to plate in separate streams in contact with the vapors rising in the column. Upon leaving the bottom plate of the stack of plates C, the streams are conducted to a collecting and distributing device 53 provided in the central portion of the low pressure section of the column. The liquid entering the low pressure section of column through conduit 47 is also discharged into the distributing device 53. The streams 52 and the stream flowing through conduit 47 are combined in the distributor 53 to form a pool in the lower portion thereof. The liquid collecting in the distributor is subdivided into a plurality of equal streams 54, each of which flows into an individual well 55 on the top plate of the lower stack of plates B in the low pressure section of the column. The streams of reflux liquid flow downwardly from plate to plate in separate streams and the vapors rising in the column bubble through the liquid flowing across the wells on each plate. The streams which flow downwardly from the downcomers in the lowermost plate of this stack of plates are collected in the pool 30 at the bottom of the low pressure section of the column which surrounds at least the lower part of the condensers 37 therein. The liquid collecting in the pool 30 condenses the gases in the condensers 37, and the heat imparted to the liquid causes the pool to boil and a gaseous stream is thus continuously boiled off from this pool. Outlet conduit 57 above the pool 30 or conduit 57' below the surface of the pool 30 is used for removing the product collecting in the bottom of the low pressure section of the column either in vapor or liquid form as desired. This stream flows to the main heat interchanger in which it gives up its cold to the incoming mixture of gases to be separated. Outgoing conduit 58 is provided at the top of the column for the removal of the gaseous product accumulating in the upper end of the low pressure section of the column. This gas likewise flows to the main heat interchanger for cooling the incoming mixture of gases to be fractionated leaving the heat interchanger at atmospheric temperature. A conduit 59 is provided leading from the top of each chamber 39 of the condensers 37 for removing a portion of the high pressure gases accumulating therein. The conduits 59 merge into a single outlet conduit 60. The high pressure stream flowing from conduit 60 may be expanded in an expansion engine to add refrigeration to the system.

*Condenser structure*

The central portion of the column including the condensers 37 is shown in more detail in Figures 2A and 2B. Additional details are shown in Figures 3–12. As shown best in Figure 3, a plurality of independent condenser units are provided. The individual units may be of any convenient size, preferably not exceeding about five feet in diameter, and the seven units shown in Figure 5 will be satisfactory for a column up to about 18 feet in diameter without running to excessive length. A larger or smaller number may be used, according to the particular requirements of the installation.

Each of the condensers comprises a bundle of tubes 61 of small diameter which are in communication at their ends with the vapor-tight chambers 39 and 40 at each end of the condenser. The tubes terminate in a tube sheet 62 near the upper end of the bundle of tubes which defines the lower end of the upper chamber 39. A tube sheet 63 is provided near the lower end of the bundle of tubes 61 for defining the upper end of the lower chamber 40. A plurality of supporting columns 64, closed at their upper ends, are provided for maintaining the tube sheets 62 and 63 in properly spaced relation. Eighteen such columns are shown in the drawings for each condenser unit although any number may be provided as needed to support the plates. A relatively wide central conduit 38 is provided which passes through the tube sheets 62 and 63 to conduct vapors from the higher pressure section of the column into the chamber 39 at the top of the condenser. At its lower end, conduit 38 slidably receives pipe 38' which, as will be explained below, extends downwardly into the high pressure section of the column to conduct vapors upwardly into the condenser. A bellows 73 is provided, enclosing each of these slidable connections to form an hermetically sealed expansion joint. The vapors which are conducted upwardly through the central conduit 38 into the chamber 39 flow downwardly through the tubes 61 and are condensed during their passage therethrough, the condensates being collected by the chamber 40 and discharged through annular passageway 41 surrounding the pipe 38'. This passageway is formed by a tubular structure 41' having its lower end rigidly connected and sealed as at 78 to the lower extremity of pipe 38' and its upper end rigidly connected to the bottom of chamber 40. A conduit 59 is provided at the top of each condenser 37 for removing gases from the chamber 39. The purpose of the conduits 59 is to equalize the upper end pressures in the several condensers and to provide for the withdrawal of incondensible gases as well as to provide for the withdrawal of the high pressure gas for use in the system if desired. A plurality of spaced bracing strips of metal 65 are provided around the periphery of each condenser being attached at their upper ends to the outer wall of the upper chamber 39 and at their lower ends to the outer wall of the lower chamber 40 to brace the structure. The strips are spaced sufficiently to permit the liquid in the pool 30 to flow freely between the tubes 61 of the condensers, and to permit the gases evolved to flow outwardly. A plurality of baffles 66, 67 and 68 are provided in the central portion of the condenser. The baffles are spaced apart vertically so as to provide a tortuous path for the gases which are formed by the boiling liquid and rise between the tubes 61. The baffles are mounted on central tube 38 and extend to the outer diameter of each condenser. Each baffle comprises two substantially segment shaped portions as indicated in Figures 5 to 7. The segment shaped portions extend on opposite sides of a central tube engaging annulus 69, each segment comprising one sixth of a circle. Each segment is provided with three holes for receiving the supporting columns 64. A plurality of smaller diameter holes 70 are drilled through each segment to provide for the passage of the small tubes 61. From Figure 4, it may be seen that thousands of small tubes 61 with relatively thin walls are provided in each condenser, thus giving an extremely large amount of heat transfer surface. The baffles 66, 67 and 68 may be considered as being formed from a single circular sheet of metal by cutting it into the shapes shown, each baffle being disposed 60° from the position of the baffle immediately above it so as to form the tortuous path for the gases.

Figure 3:
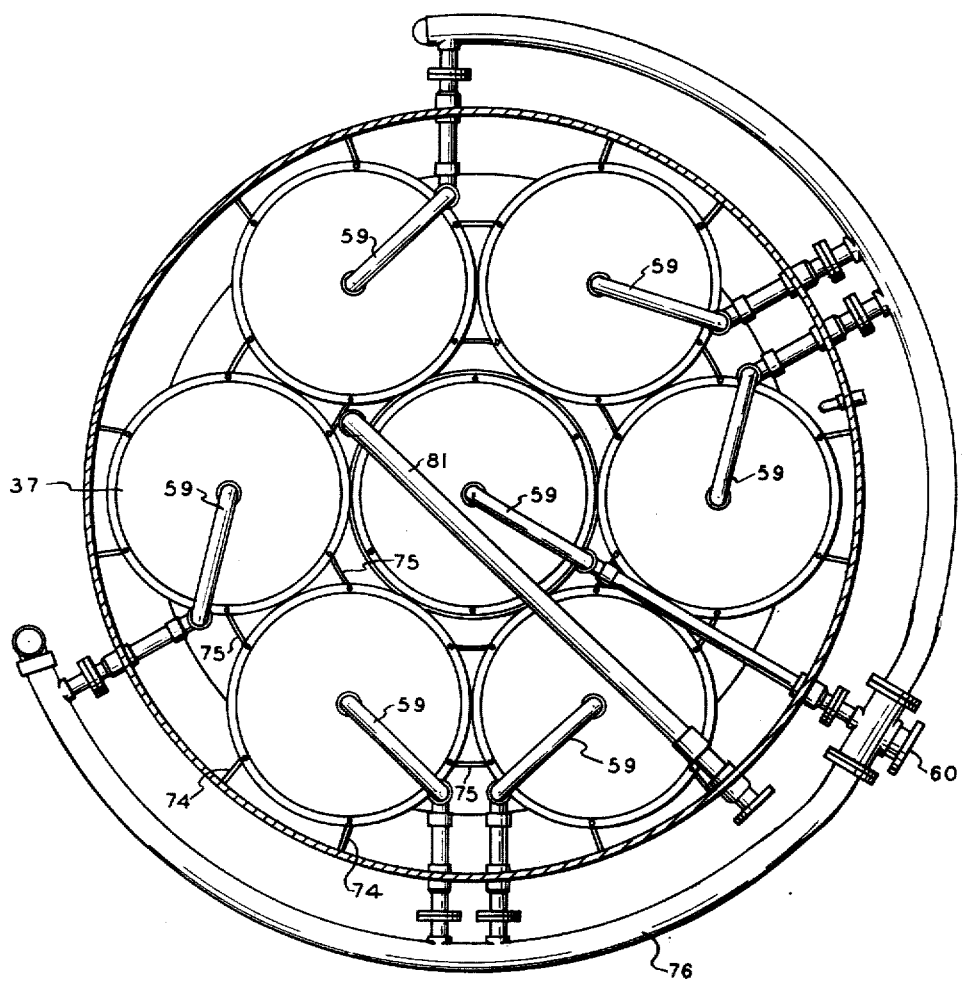
Figure 3 is a horizontal sectional view through the column along line III—III of Figure 2A.

The arrangement of the condensers within the column as shown in Figure 3 provides for seven condensers, one of which is located in the center of the column and the six remaining condensers surrounding it. The six surrounding condensers are equally spaced around the column at 60° intervals. The condensers are supported in the column by a plurality of vertical radially extending walls 74 and a plurality of vertical and concentric walls 75, all of which are supported on the partition plate 33.

As stated above, the gas liquefied in each of the condensers 37 is returned to the high pressure section of the column through the annular space between pipe 38' and tubular structure 41'. This liquid collects in the lower end of the annular space 41.

The level of this liquid in the annular spaces 41 of the six outside condensers and that of the center condenser is equalized by tubes 79 extending from each of the former to the latter as best shown in Figures 8 and 9. Each conduit 79 is provided with an expansion joint sealed by bellows 80. A branch conduit 81 extends from the annular space 41 of the center condenser and passes through the wall of the column to permit the withdrawal of a desired proportion of the condensed gas for refluxing the plates of the low pressure section. As indicated in the drawings, the conduit 81 extends upwardly, leaving the column at a height near the upper ends of the condensers. The portion of the liquid required for refluxing the plates of the low pressure section flows through conduit 81 into conduit 45 which leads to expansion valve 46 and the upper distributor 49 in the low pressure section of the column as shown in Figure 1. Each of the tubular structures 41' is provided with a plurality of orifices 82 equally spaced about the circumference of the structure near the lower end thereof. These orifices are of equal size so that an equal volume of liquid will flow through each orifice of each tube in the same time interval. This structure is shown in Figures 2B and 10. A plurality of tubes 83 are connected to the orifices 82 which conduct the liquid streams from each orifice to one of the wells in the top plate of the stack of plates A in the high pressure section of the column. An antisiphon device 84 is provided in each tube 83 to prevent siphoning action. Figure 10 illustrates the position of the orifices 82, the tubes 83, and the wells on the top plate of stack A, with each tube 83 leading to one of the wells.

The preferred arrangement of the small tubes 61 is shown in Figure 4. Each of the small tubes is individually received at each end in the tube sheets 62 and 63 at the top and bottom, respectively, of each condenser, and the tubes are separated one from another so as to permit the flow of the cooling liquid between the tubes. An alternative arrangement is shown in Figures 11 and 12. In this modified arrangement, each condenser includes vapor-tight chambers 39 and 40 at each end thereof as in the preferred embodiment, with plates 62 and 63 at the upper and lower end and a central tube 38 passing through the plates. A plurality of condensing cylinders 86 are distributed about the cross section of the condenser in the space surrounding the central tube 38. Each of the condensing cylinders 86 is attached at its upper end to the plate 62 and at its lower end to the plate 63. The condensing cylinders 86 are much larger in diameter than the tubes 61 shown in Figure 2B, having a diameter of an inch or more.

Increased contact surface is provided within the cylinders 86 by filling each cylinder with the largest possible number of smaller tubes 87. For example, a 2-inch inside diameter cylinder 86 may contain 52 ¼-inch outside diameter tubes 87, as suggested in Figure 12. The small tubes 87 are formed into a cylindrical bundle of a length preferably slightly greater than that of the cylinders 86, filling strips 88 being used to complete the circular contour and hold the narrow tubes in close heat exchange contact with each other and the cylinder. Each of the tubes 87 and the strips 88 are tinned with solder or other relatively fusible heat conducting metal. The cylindrical bundle is then forced through the cylinder 86 in which it should fit tightly, and the assembly is heated until the solder fuses. Upon cooling, the entire unit is a honeycombed structure, each part of which is in heat conductive relation with every other part, including the wall of the cylinder 86. Finally, the ends of the assembly are squared off and the cylinders 86, so assembled, are inserted and made fast to the tube sheets 62 and 63.

This construction has the advantage over the use of small individually mounted tubes in that it greatly reduces the number of joints between the tubes and the tube sheets with a corresponding reduction in the labor of assembling and the chances for leakage.

A large nipple 90 surrounds in spaced relation the tubular structure 41' of each condenser and is sealed in partition plate 33 and through bellows 91 is joined to a closure member 91' mounted on tubular structure 41'. The space 92 between tubular structure 41' and this last described structure, being open at the top and at that point in communication with pool 30, is filled with the liquid of pool 30. A conduit 93 is attached to each annular space 92 at the bottom thereof for conducting liquid from the annular spaces out of the column. The conduits 93 meet in a common conduit 94 which passes through the column wall. In operation of the column over long periods, solid impurities tend to collect in the bottom of the spaces 92 and by the arrangement shown, these solids can be withdrawn from the column by removal with a portion of the liquid through the conduits 93 and 94 out of the column.

The operation of the condenser structures in an air fractionation system is as follows: In the operation of the column, gaseous nitrogen flows upwardly which separates from the feed air in the high pressure section of the column, therein entering the central vapor tubes 38 of each of the seven condensers shown. The nitrogen vapor flows upwardly through each central tube and thence into the upper chamber 39 at the top of each condenser. If a portion of this high pressure nitrogen is needed in the cycle for expansion to supply refrigeration, for example, it is drawn off through the conduits 59 into the common manifold 60 and thence to the expander. The remainder of the high pressure gaseous nitrogen not drawn off through the conduits 59 flows downwardly through the condensing tubes 61, each of which is surrounded by a pool of boiling liquid oxygen in the bottom of the low pressure section of the column. Since the boiling point of nitrogen at 5 atmospheres pressure is −179° C., the pressure present in the high pressure section of the column, and the boiling point of oxygen at approximately atmospheric pressure is −183° C., the pressure present in the low pressure section, the oxygen will cool the nitrogen below its boiling point, causing it to condense during its flow downwardly through the tubes 61. The liquid nitrogen formed passes into the lower chambers 40 of the condensers and thence downwardly into the annular space 41 between the central pipe 38' and the surrounding tubular structures 41', collecting therein. Each of the annular spaces of the several outer condensers are connected to the annular space of the central condenser through conduits 79, thus equalizing the liquid levels in the annular spaces. A portion of this liquid is withdrawn from the column through conduits 80 and 81 and is conducted via conduit 45 and expansion valve 46 into the upper distributor 49 in the low pressure section of the column where it serves as reflux.

The remainder of the liquid nitrogen collecting in the annular spaces is passed through the orifices 82 at the lower end of the tubular structures 41' in a plurality of equal streams into the tubes 83, each of which conducts a stream of liquid to the centrally disposed dam or weir (to be described later) in each well on the top plate of the stack of plates A in the high pressure section of the column, to serve as reflux therein.

While the assembly has been described as used for condensing high pressure nitrogen vapor, it will be evident that it is useful in any heat interchange between fluids.

*Bubble plate structure*

The structure of the bubble plates is best shown in Figures 13 to 18, taken in connection with Figures 1 and 2. As indicated in Figure 1, two stacks of fractionating plates are provided in the low pressure section of the column designated as B and C, respectively. A distributor 49 is provided above the stack of plates C and a collecting and redistributing device 53 is provided between the stack of plates C and B. A single stack of plates A is provided in the high pressure section of the column. In general, the construction of the plates in the three stacks is similar except that the diameters of the plates in the stack A are smaller than the diameters of the plates in the stacks B and C.

Each plate is made up of a plurality of wells 150, 150' in such number and dimensions as substantially to occupy the cross sectional area of the column. With respect to some aspects of the present invention, these wells may be of any form which will assemble to form a substantially closed pattern, e. g., rectangular or hexagonal, but are preferably in the shape of equilateral triangles as illustrated in the drawings. Each well 150, 150' has a flat bottom 151 and substantially vertical boundary walls 152. The wells may be fabricated from flat metal blanks of the proper shape by bending the walls through a 90° angle and soldering the corners to form liquid tight walls, or the walls may be formed by stamping. Each wall 152 is bent inwardly along its upper edge as at 153. When the wells are assembled edge to edge, the inwardly bent edges of abutting walls form a V-groove which is filled with solder as at 154 to form a seal between the wells to prevent the upward leakage of vapor. Each well is provided with a centrally disposed dam or weir 155, preferably circular, forming a central pocket, and with dams or weirs 156 forming a pocket at each corner. The top plate of each stack and subsequent alternating plates are provided with wells 150 which have a plurality of downcomers 157, one draining each of the corner pockets, the central pocket in each well being undrained. The second plate of each stack and subsequent alternating plates are provided with wells 150' which have a single downcomer 158 draining the central pocket, the corner pockets being undrained. The downcomers from the lowermost plate in the stacks A and B are provided with downcomer seals 159 to prevent the upflow of vapor therethrough.

In assembling the column, the above described two types of plates may be alternated, the first plate having wells 150 with corner downcomers 157, the second plate having wells 150' with center downcomers 158, and so on. These two forms are so distributed that the corner pockets in one well have their downcomers sealed in liquid in the undrained corner pockets of the well next below, while the central downcomer in this next lower well is liquid sealed in an undrained central pocket in the third well. Ordinarily, all of the wells in one plate may have corner downcomers and all the wells on the next lower plate central downcomers, but the only essential as to arrangement is that the two forms of wells alternate in vertical succession. The effect of this arrangement is to cause the refluxing liquid to flow across the bottom of one well from center to corners and across the bottom of the next lower well from corners to center, the extent of the horizontal flow being thus identical for the two forms and being less than half the major dimension of the well.

The bottoms of the wells, outside the described pockets, are provided with a plurality of small bubble caps 160 of any preferred pattern, the form shown in the drawings being conventional. The bottom of each well is drilled with a plurality of holes into which are placed the vapor risers. The vapor risers are soldered to the well to give a vapor tight seal. The bubble caps are placed over the vapor risers and supported with the skirts spaced from the bottom of the well.

As it is impossible to fit wells having straight sides to the wall of a cylindrical shell, it is necessary to provide filling elements for such uncovered spaces as at 161 and 162 in Figures 13 and 14. Small wells of suitable shape may be provided for this purpose if it is desired to utilize the plate area completely, but it is preferable to cover these spaces with relatively heavy sheet metal, soldered or brazed to the column wall, and to the abutting wells.

The structure of the plates above described has material advantages over forms of plates heretofore used for fractionating liquefied gases, and particularly for the construction of columns of great diameters.

The individual wells will preferably be of small size— for example, from 12 to 20 inches in major dimension— and may be fabricated almost entirely by machine at a trifling labor cost. Due to the method of supporting these wells, to be described hereafter, and the support given to the side walls by abutting wells, they may be constructed of very thin sheet material. The horizontal distance traveled by the refluxing liquid in each well is so slight that absolute accuracy in leveling of the plate is not required, and therefore the effects following from tilting of the column or sagging of the plates is negligible. For example, in a column of 12 feet plate diameter in which a single liquid pool is maintained on each plate, a difference in level of one-eighth inch between the two sides of the plate, or between the edge and the center, is enough to reduce the fractionating efficiency of the plate materially. A plate of the herein described construction having 12–15 inch wells would have to depart from level by about 3½ inches to produce the same drop in efficiency.

By reason of the small dimensions of the wells and the short travel of the refluxing liquid, it is possible to use very short bubble caps which are in the neighborhood of one inch in height. Heretofore, such bubble caps have been used in very small columns but have been completely unsuitable for use in columns with plates of large diameters. The use of short bubble caps permits close spacing of the plates without sacrifice of efficiency. A spacing of from 2½ to 3 inches center-to-center has been found to be sufficient for even the widest columns.

As each vertical succession of wells conducts an individual stream of refluxing liquid from the top to the bottom of each stack of plates, while the upflowing vapors are intermingled and equalized in the spaces between the plates, an extremely even and effective vapor-liquid contact is produced and a high degree of fractionating efficiency is assured.

Another arrangement for forming the individual wells on the plate and for assembling the plate in the column is shown in Figure 30 of the drawings. In this embodiment a plurality of triangularly shaped wells are arranged to form a hexagon. One half of the wells on each plate are similar to the wells 150 shown in Figure 14 which have a plurality of downcomers 157 draining the corner pockets, while the other half of the wells of each plate correspond to the type of well 150' illustrated in Figure 13 which have a single downcomer 158 draining the central pocket. These two types of wells are so grouped as to form six major triangles bounded by lines extending from the center of the hexagon to its angles and by the straight sides of the hexagon, the apices of the triangles in the plate shown in Figure 30 being indicated at L, M, N, O, P, Q and R. All of the wells in each major triangle have their drain tubes similarly disposed and this disposition is alternated: e. g., all the wells in major triangles LMN, MOP, and MQR, herein termed "corner draining triangles," have a drain tube 157 in each corner, and all the wells in triangles NOM, NPQ and LRM, termed "centrally draining triangles," have each a centrally located drain tube.

In this arrangement the same type of plates are used throughout the column but each plate is oriented at an angle of 60° to the plate next below (when six major triangles are employed) in such a manner so that each corner draining triangle is arranged above or below and coinciding with a centrally draining triangle. Also, the wells are arranged on the plates so that all of the wells comprising superimposed corner draining triangles and centrally draining triangles are arranged one below the other so that wells 150' having central drain tubes 158 feed wells 150 in the next tray below having corner drain tubes 157 feeding another well 150' next below.

This arrangement permits all the plates to be identical in pattern while bringing all the central drain tubes over wells having corner draining, and vice versa. Thus, the flow in each well having a central drain tube is from the corners to the center, and in each well having corner drain tubes from the center to the corners.

*Bubble plate supporting structure*

The bottom plate in each of the stacks of plates A, B and C is supported on a grid structure 175 which is welded to the inner column wall. Figures 19 to 22, inclusive, show a form of grid structure which is suitable for use in the low pressure section of the column. A grid structure for the high pressure section of the column would be similar to that shown in Figures 19 and 20, except that the diameter would be smaller. In the preferred embodiment, the grid structure is composed of a plurality of bars 176 of relatively short length which are joined together in the form of equilateral triangles to cover the entire cross sectional area of the column. The side of each equilateral triangle is twice the length of the side of one of the triangular wells 150, 150' so that each equilateral triangle in the grid will support four wells as shown in dotted lines in Figure 19.

Completely surrounding the grid structure is a circumferential metal band 177 to which the outer ends of the bars 176 are attached. The metal band 177 is in turn attached to the inner wall of the column. As indicated in Figure 20, the band 177 is of appreciably less depth than the bars 176. Each of the bars 176 is joined together by means of a joiner bar 178 at their points of intersection 179. As shown in Figure 21, the ends of the bars 176 at their points of intersection are cut away at their center portion as at 180 so as to accommodate the joiner bar in the cut away portion. The bars 176 are welded to the joiner bar 178 and to each other at each of these joints as shown in Figure 22.

A plurality of small plates 181 are welded to the top surface of the grid structure at intervals corresponding to the length of the sides of the fractionating wells 150. The small plates 181 are so attached to the grid structure that their upper surfaces form a level surface onto which the lowermost plate of the stack may be assembled.

Referring to Figures 1 and 2, it will be seen that a grid structure 175 similar to that described above will be necessary to support the lowermost plate in the stacks B and C in the low pressure section of the column and for the lowermost plate in the stack A in the high pressure section of the column. These grids are supported on lugs or projections mounted on the inside walls of the column.

In the preferred embodiment of the invention, only the lowermost plates of the stacks are supported by the grid structures described; however, it should be noted that each plate in the stacks can be supported in like manner, should it be deemed advisable. The preferred method of supporting the remaining plates will be described hereafter.

*Plate spacing structure and method of plate assembly and leveling*

In the construction of a column in accordance with the present invention, the column is necessarily assembled at the point of use due to its tremendous size. The grid structure for the high pressure section of the column is first assembled as described above by welding the bars 176 to the joiner bar 178 and to the metal band 177. The band is supported on the inner column wall in such a manner as to give a level upper grid surface. The small plates 181 then welded or otherwise suitably anchored onto the upper surface of the grid in such a manner that the top surfaces of the small plates all lie in a horizontal plane.

The lowermost fractionating plate may now be assembled on the grid structure. Each of the triangular fractionating wells 150' is placed on the grid so that each of its corners is supported on one of the small plates 181. Except at the margins of the column, each small plate 181 will thus support one of the corners of six different wells which meet at that point. The arrangement of the wells on the grid is indicated in dotted lines in Figure 19. The spaces next to the column wall are filled in with the filling elements 160 and 161. When the wells and filling elements have all been properly attached to the grid and the column wall, and the V-grooves formed between the upper edges of adjacent wells have been filled with solder, a complete plate will have been formed that is level and vapor-tight except at the openings provided specifically for the passage of liquids and vapors. The wells used in the lowermost plate are provided with downcomer liquid seals 159 on the end of each downcomer 158.

The next higher plate is now ready to be assembled. At the points where the corners of the triangular wells 150' meet are placed tray spacers 185. The tray spacers 185, best shown in Figures 17 and 18, are made up of two metal telescoping cylinders 186, 187. The outer or lower cylinder 186 is internally threaded at its upper end to accommodate the inner or upper cylinder 187 which is of smaller diameter and externally threaded at its lower end. The upper cylinder may be screwed down into the lower cylinder so that the over-all length from the bottom of the lower cylinder to the top of the upper cylinder may be varied. The lower cylinder is provided with a plurality of slots 188 extending upwardly from the lower end. The slots are made of a width and height so that they are large enough to fit over the soldered walls 153 of the two of the wells 150', as shown in Figures 17 and 18. Except for the marginal portion of the fractionating plates, the corners of six wells will meet at each point. Thus, the tray spacers 185 for these points will be provided with six slots equally spaced around the cylinder so that the spacers may be placed surrounding the points with their bottom surfaces resting on the bottoms of the wells. The bottom surfaces on each side of a slot will rest on the bottom surfaces of two different wells.

Near the column wall, only two, three or four well corners will meet at each point. At these points, the tray spacers can be provided with two, three or four slots, as necessary, to fit over the walls of wells meeting at that point. However, if desired, spacers with six slots can be used at all points with only the required number of the slots being used.

In assembling the second plate, one tray spacer 185 is first placed over a point of intersection of the corners of a plurality of wells in the plate below and is adjusted to the proper height so as to obtain a desirable plate spacing. The upper and lower cylinders of the spacer are then soldered together to form a unitary spacer construction. The top surface of this spacer is then utilized as the reference surface from which the entire plate is assembled and leveled. Next, two additional tray spacers are placed over two adjacent points of intersection. The upper cylinders of the spacers are screwed up or down with respect to the lower cylinders, so that the upper surfaces of the three tray spacers form a level support for a triangular fractionating well 150 which is placed thereon after each of these tray spacers have been soldered to form a unitary structure. It will be apparent that the upper surface of each tray spacer thus properly leveled becomes the support point for a corner of five additional wells. Additional tray spacers are then inserted and leveled with respect to the already leveled spacers, each such additional tray spacer forming a support point for a plurality of well corners with one leveling operation, until the operative area of the plate has been covered. The triangular wells 150 are soldered together and to the filling elements 161, 162 as previously described to form a vapor-tight plate assembly.

The next higher plate is now ready to be assembled in a similar manner, starting with a single tray spacer placed at one of the points of intersection of the corners of a plurality of the wells 150 on the plate below. Using the upper surface of this spacer as a reference point, the entire plate is assembled and leveled thereto as previously described. This procedure is continued until the desired number of plates have been assembled.

It will be noted that the use of a well of equilateral triangular shape makes possible leveling of each well by setting up the minimum possible number of support points for each well, while at the same time resulting in a composite polygonal shape for the operative part of the tray covering the maximum area of the circular cross section of the column.

The height of the tray spacers is so chosen that the downcomers from the plate above will extend down into the pools of liquid collecting either in the center or corner pockets of the triangular wells in the plate below. Since the walls of the triangular wells are shorter than the height of the spacers, there will be provided a space between the tops of the walls of the triangular wells and the lower surface of the fractionating plate above to permit the vapors rising from each well to intermingle before passing upwardly through the bubble caps of the wells next above. The liquid flowing downwardly through the downcomers collects in the wells at a level regulated by the height of the dams or weirs in each well. Since the height of the walls of the wells is greater than the height of the dams or weirs, it will be readily seen that the liquid stream flowing in each well of a fractionating plate is kept separate from the liquid stream flowing in each other well of the plate. Thus, the individual liquid streams added to the wells in the top plate of a stack flow downwardly from plate to plate crossing one well only in each plate in individual streams without intermingling until all of the streams are merged upon leaving the lowermost plate in the stack. With the present invention, the alternate center and corner drains cause the liquid to flow a short and equal distance across the bottom of each well.

According to this method of plate assembly and leveling, since each fractionating well is supported at its three corners, there is little likelihood of plate distortion. By utilization of the triangular shape, each unit of a plate is readily leveled by placing its three corners on three points, the least number possible. This reduces the leveling operation to the absolute minimum of time and effort. Since the plates are assembled on the site of erection within the column from a plurality of small parts, the shipment of huge assembled plates is unnecessary. Further, should it become necessary for any reason to dismantle a portion of the column, the plates can be easily removed and reassembled.

Distributors

The means for distributing the reflux liquid over the top plate of each of the stacks A, B and C in the column so that a stream of liquid of equal volume will be fed to each fractionating well on the top plate is an important feature of the present invention.

The distributor for the high pressure section of the column is incorporated as part of the condenser structure and has been described under the heading of Condenser Structure. In the high pressure section of the column, the reflux to be distributed is a portion of the condensate from the condensers which is flowing downwardly and collecting in the annular space at the bottom of each condenser between the central tube 38 and the annular tube 41. A plurality of orifices 82 in the lower end of each annular tube 41 permits the flow of this condensed liquid in equal streams to the fractionating wells of the top plate of the stack A. Thus, in effect, there are seven distributors, one associated with each condenser.

At the top of the low pressure section of the fractionating column, above the stack of plates C, a portion of the condensed liquid from the condensers 37 which has been expanded in expansion valve 46, or its equivalent, is brought into the column through conduit 45 and serves as reflux in the stack of plates C. A distributor device 49 is provided at this point in the column to distribute the reflux liquid in equal streams to each of the fractionating wells in the top plate of stack C. This distributor is illustrated in Figures 1, 2A, 23 and 24.

The distributor 49 is supported in the center of the column by means of a plurality of supporting members 200, 201, 202 and 203. Four brackets 200 attached to the inner wall of the column support opposite ends of a pair of channel members 201 which in turn support opposite ends of a second pair of channel members 202 to form a square frame receiving the distributor. Ears 203 on the distributor rest on each of the four channel members and are connected thereto.

The distributor is comprised of an annular space defined by an inner wall 204 and an outer wall 205 concentric with one another and joined at their lower ends by an annular sheet member 206 which closes the bottom of the annular space. The height of the inner wall 204 is less than the height of the outer wall 205. The central portion enclosed by the inner wall 204 is open at the top and bottom and permits the upward flow of gases therethrough which leave the column through conduit 58. A cylindrical partition member 207 is provided between the walls 204 and 205 extending from the top of wall 205 to a point above and spaced from the annular sheet member 206. Supporting members 208 attached at one end to the outer wall 205 and at the other end to the partition 207 are provided to support the partition 207 and properly position the same with respect to the outer wall 205. Supporting members 209 attached at one end to the inner wall 204 and at the other end to the partition 207 act in like manner to support the partition 207 and to position inner wall 204 with respect to the other parts. As shown in Figure 23, the supporting members 208 and 209 are spaced at equal intervals about the circumference of the distributor.

The incoming conduit 45 is tangentially attached to the distributor outer wall 205 so that the liquid entering the distributor through the conduit 45 passes into the outer annular space between the outer wall 205 and the partition 207.

In the lower partition of the outer wall 205 and the inner wall 204 are a plurality of calibrated orifices 210 of equal diameter. As shown in Figures 2A and 24, a tube 50 is attached to each orifice 210 and serves to conduct a stream of liquid from the pool collecting in the distributor to the central pocket surrounded by the dam 155 in a fractionating well 150 on the top plate of the stack C. An anti-siphon device 212, in the form of an open ended riser tube, is provided in each tube 50 to prevent the possibility of a siphoning action. It will be seen that the number of orifices 210 will correspond with the number of fractionating wells 150 on the top plate of stack C.

The operation of the distributor 49 is as follows: Liquid nitrogen separated from the air feed in the high pressure section of the column and condensed in the condensers 37 flows through an expansion valve 46 and conduit 45 to the distributor 49 into which it is admitted tangentially into the outer annular space between the outer wall 205 and the partition 207. The liquid flows circumferentially and downwardly and collects in a pool in the base of the distributor. Since the partition 207 does not extend to the bottom of the distributor, the liquid pool accumulates on both sides of the partition plate. Due to the tangential arrangement of conduit 45, the baffling effect of lower supporting members 208 and the isolating effect of partition 207, a relatively quiescent body of liquid is formed between inner wall 204 and partition 207. This gives a relatively uniform head acting on the liquid leaving the distributor through the orifices 210 and the tubes 50 to the fractionating wells 150 on the top plate of the stack C. The stream of liquid flowing in each tube 50 is of equal volume since each of the orifices is of equal diameter and each orifice leads from the same body of liquid of uniform head. Thus, the liquid entering through conduit 45 is subdivided into a pluraliy of equal streams, each of which is conducted to one of the fractionating wells in the top plate of the stack C. Each of these streams flows downwardly from plate to plate in individual streams in contact with the rising vapors to the bottom plate of the stack. From the bottom plate, each of the streams is conducted to a second distributor 53.

The structure of distributor 53 shown in Figures 1, 2A, 25, 26 and 27 is somewhat similar to the structure of distributor 49 described above. Distributor 53 is supported in the center of the column by means of supporting channel members 215 which are similar to members 201 and 202 and are supported on brackets 216 attached to the inner wall of the column and support the distributor by means of ears 217. The distributor comprises an annular space defined by an inner wall 218 and an outer wall 219 joined together at their lower ends by an annular sheet member 220 which closes the bottom of the annular space. The height of the inner wall 218 is somewhat less than the height of the outer wall 219. The central portion enclosed by the inner wall 218 is open at the top and bottom to permit the upward flow of gases from the top plate of stack B to the lowermost plate of stack C. A cylindrical partition member 221 extends downward between the walls 218 and 219 from the top of outer wall 219 to a point above annular sheet member 220. The partition member is held in position by means of a plurality of supporting members 222 attached at one end to the outer wall 219 and at the other end to the partition 221 and by a plurality of supporting members 223 attached at one end to the inner wall 218 and at the other end to the partition 221. As shown in Figure 25, the supporting members 222 and 223 may be spaced at equal intervals about the circumference of the distributor.

The incoming conduit 47 is tangentially arranged and is attached to the distributor outer wall 219 so that the liquid entering the distributor through the conduit 47 passes circumferentially into the outer annular space between the partition and the outer wall.

The liquid streams descending from the lowermost plate of the stack C are conducted in conduits 52 from each downcomer in the plate to the inner annular space between the partition and the inner wall. The lower ends of the tubes 52 extend downwardly into the inner annular space to a point about one-third of the distance from the top of the inner wall to the bottom thereof. The lower end of each tube 52 drains into a cup 225 which is attached to the tube at a point on its periphery and surrounds it, thus forming a liquid seal for each tube. The liquid flows over the cup wall and downwardly in the inner annular space to the pool of liquid collecting at the bottom thereof. Since the partition 220 does not extend to the bottom of the distributor, the liquids flowing in the outer and inner annular spaces merge at the bottom of the distributor into a single pool. The circumferential motion of the liquid entering through the conduit 47 thoroughly mixes this stream with the liquid streams from the tubes 52.

In the lower portion of the outer wall 219 and the inner wall 218 are a plurality of calibrated orifices 226 of equal diameter. A tube 54 is attached to each orifice 226 and serves to conduct a stream of liquid from the pool collecting in the distributor to the central pocket surrounded by the dam 155 in a fractionating well 150 on the top plate of the stack B. An antisiphon device 227, in the form of an open ended riser tube, is provided in each tube 54 to prevent the possibility of siphoning action. The arrangement of the tubes 52 and the tubes 54 is most clearly shown in Figure 27. The portion of the figure to the right of the center line shows the grid for the stack of plates C and the plurality of tubes 52 leading to the inner annular portion of the distributor. The portion of the figure to the left of the center line shows the lower portion of the distributor 53, the orifices 226, and the tubes 54 leading to the center pockets in the fractionating wells 150 of the top plate of the stack B. Figure 28 and 29 are enlarged views showing the cups at the lower end of the tubes 52.

The operation of the distributor 53 is as follows: The crude liquid oxygen separated from the air feed in the high pressure section of the column and collecting in a pool at the bottom thereof flows through conduit 47 and expansion valve 48 to the distributor 53. This stream is admitted tangentially into the outer annular space between the outer wall 219 and the partition 221. The liquid flows downwardly and collects in a pool in the base of the distributor. The liquid streams from the upper distributor 49 which have passed downwardly through the plates in the stack C in contact with the vapors rising therethrough are conducted by tubes 52 to the inner annular space in the distributor 53. The liquid overflows the cups 225 at the bottoms of the tubes 52 and flows downwardly in the inner annular space to the pool at the bottom of the distributor. The liquid from the inner and outer annular spaces merge and are completely mixed forming a pool. Liquid from the pool flows out of the distributor through the orifices 226 and the tubes 54 to the fractionating wells 150 on the top plate of the stack B. The stream of liquid flowing in each tube 54 is of equal volume since each of the orifices is of equal diameter and each orifice leads from the same pool and has the same head of liquid. This distributor serves the function of collecting all of the streams of liquid flowing from the stack C, mixing them together and with the crude oxygen stream flowing in the conduit 47, and redistributing this merged liquid pool into a plurality of equal streams for reflux in the stack B.

Conclusion

The use of the structure above described produces a column of any desired size, having the maximum fractionating efficiency, at a cost much less than that incurred in fabricating the columns of the prior art.

Although the operation of the two stage column has been especially described for the fractionation of air, the assembly could be used for any gas-liquid contact operation, especially for the separation of mixtures of lower boiling gases.

The condenser assembly described herein is considered to be novel per se and can be used for any heat interchange operation in combination with a fractionating column or independently thereof. Such condensers find many applications which are entirely independent of the use specified herein and should not be limited to the combination with a fractionating column.

The use of fractionating wells of the construction described to form a plate is applicable to any gas-liquid contact apparatus and is not limited to low temperature fractionations. The construction described herein is likewise applicable to gas absorption towers, scrubbers, high temperature fractionations and rectifications, etc.

The method described herein of leveling the plates in a column, the use of the tray spacer described, and the grid assembly are applicable to any column containing a plurality of plates regardless of the type of plate employed. Further, the distributors described herein are applicable for use in other environments and are independent of the specific type of column disclosed.

Obviously, certain other features of the invention may likewise be used independently of others and changes may be made in various details of the apparatus without departing from the essentials of the invention.

This application is a continuation-in-part of my copending application entitled "Gas-Liquid Contact Apparatus," Serial No. 134,663, filed December 23, 1949, now abandoned.

I claim:

1. In combination with a fractionating column having a section operating at a relatively high pressure and another section operating at a relatively low pressure separated by a partition plate, means for condensing vapors originating in the high pressure section comprising a plurality of individual condensing units operated in parallel and at least partially submerged in the liquid collecting in the base of the low pressure section, a plurality of conduits passing through the partition plate connecting the high pressure section of the column with each condensing unit, a nipple carried by the partition spaced from and surrounding each said conduit at the region in which the conduit passes through the partition plate, the nipple opening upwardly into the liquid pool collecting in the base of the low pressure section, a bellows attached at its upper end to the lower end of each nipple, and a closure member carried by each of the conduits and attached to the lower end of each bellows.

2. Apparatus in accordance with claim 1 in which a discharge conduit is connected to each closure member for conducting a portion of the product collecting in the base of the low pressure section of the column out of the column.

3. In a gas-liquid contact column, a succession of bubble plates each comprising a plurality of triangular shaped wells, each well being provided with side walls and a flat bottom, means for joining the wells in mutual side contact with their apices meeting at points, a plurality of spacers each having a top surface and a bottom surface, the bottom surface of each spacer being provided with a plurality of slots extending upwardly therefrom, a spacer being located at each of the points with the bottom surfaces of the spacers resting on the flat bottoms of the wells with each slot receiving the side walls of a pair of abutting wells, the upper surfaces of the spacers providing supports at the joining points of the bubble plates above.

4. In a gas-liquid contact column, a succession of bubble plates each comprising a plurality of triangular shaped wells, each well being provided with side walls and a flat bottom, means for joining the wells in mutual side contact with their apices meeting at points, a plurality of cylindrical members each having a flat bottom surface and each including a plurality of spaced longitudinal slots extending upwardly from the bottom surface, a first cylindrical member being located at each of the points with the bottom surfaces of the cylindrical members resting on the flat bottoms of the wells and with each slot receiving the side walls of a pair of abutting wells, and a second cylindrical member having a flat upper surface adjustably supported on each of the first cylindrical members, the upper surfaces of the second cylindrical members providing supports at the points of the bubble plate above and being adjustable with respect to the lower surfaces of the first cylindrical members to form a level supporting base for the next bubble plate above.

5. In a gas-liquid contact column; a plurality of vertically spaced trays; each tray including a plurality of individual wells; each well having a flat bottom portion in the shape of an equilateral triangle presenting corners and impervious side walls joined to and depending upwardly from the bottom portion, means for retaining a pool of liquid in the well and means for conducting upwardly flowing vapor through the liquid of the pool; a grid spanning the cross-sectional area of the column; the grid comprising a plurality of elongated members interconnected at their ends to form a plurality of open equilateral triangular structures; the length of the side of the wells being one-half the length of the sides of the triangular structures, a supporting member secured to the upper surface of the elongated members at the apices of the triangular structures and at medial points of the sides of the triangular structures and extending upwardly beyond the upper surfaces of the elongated members; the wells forming the lowermost tray being supported on the grid with four wells being supported by one triangular structure wherein the corners of three wells of the four wells are supported by supporting members at the apices of the triangular structure and at medial points of pairs of sides of the triangular structure and wherein the corners of the other well of the four wells are supported by the supporting members at medial points of the sides of the triangular structure; and a spacer located at the points of intersection of the wells of the lowermost tray; each spacer including a lower surface being supported by the bottom portions of the wells above the supporting members and being provided with a plurality of slots adapted to receive the side walls of adjacent wells, and an upper surface adapted to support corners of the wells forming the next higher tray.

6. In a gas-liquid contact column, a succession of bubble plates arranged in spaced relation, each plate comprising a plurality of wells, each well including a flat bottom portion and upstanding impervious side wall portions, the wells of each plate being arranged in liquid-tight contiguous relation, each well including means for retaining a pool of liquid therein and for maintaining the liquid segregated from the liquid retained by the other wells of the same plate, alternate plates of the succession of bubble plates comprising a plurality of wells each including a plurality of peripheral drain pipes and an imperforate area located centrally of the bottom portion, the remaining plates of the succession of bubble plates comprising a plurality of wells each including a centrally disposed drain pipe and a plurality of peripheral imperforate areas located in the bottom portion, the wells of alternate plates including a plurality of peripheral drain pipes being in vertical alignment with wells of the remaining plates including a centrally disposed drain pipe with the centrally disposed imperforate areas of the wells of the alternate plates being positioned below the centrally disposed drain pipe of the corresponding wells of the next tray above and with the peripheral drain pipes of the wells of the alternate plates being positioned above the peripheral imperforate areas of corresponding wells of the next plate below, and the gas-liquid contact means disposed over at least a major portion of the bottom portion of each well.

7. In a gas-liquid contact column, a succession of bubble plates arranged in spaced relation, each plate comprising a plurality of wells, each well including a flat bottom portion of triangular shape and upstanding imperforate side wall portions, the wells of each plate being arranged in liquid-tight contiguous relation, each well including means for retaining a pool of liquid therein and for maintaining the liquid segregated from the liquid retained by the other wells on the same plate, alternate plates of the succession of bubble plates comprising a plurality of wells each including a drain pipe disposed adjacent each corner of its bottom portion and an imperforate area located centrally of its bottom portion, the remaining plates of the succession of bubble plates comprising a plurality of wells each including a centrally located drain pipe and an imperforate area disposed adjacent each corner of its bottom portion, the wells of alternate plates including a drain pipe disposed adjacent each corner of its bottom portion and the wells of the remaining plates including a centrally disposed drain pipe being in vertical alignment with the centrally disposed imperforate area of the wells of the alternate plates positioned below the centrally disposed drain pipe of corresponding wells of the next tray above and with the corner drain pipes of the wells of alternate plates positioned above the imperforate areas at the corners of corresponding wells of the next tray below, and gas-liquid contact means disposed over at least the major portion of the bottom portion of each well.

8. In a gas-liquid contact column as defined in claim 6 in which the wells including a plurality of peripheral drain pipes and an imperforate area located centrally of the bottom portion comprise one half the wells on the alternate plates and in which the wells including a centrally disposed drain pipe and a plurality of peripheral imperforate areas located in the bottom portion comprise one half the wells on the remaining plates, the other half of the wells on the alternate plates each including a centrally disposed drain pipe and a plurality of peripheral imperforate areas located in the bottom portion and the other half of the wells on the remaining plates each including a plurality of peripheral drain pipes and an imperforate area located centrally of the bottom portion, wells having a centrally disposed drain outlet being positioned above wells having a centrally disposed imperforate area and wells having peripheral drain outlets being positioned above wells having peripheral imperforate areas.

9. In a gas-liquid contact column as defined in claim 7 in which the wells including a drain pipe disposed adjacent each corner of its bottom portion and an imperforate area located centrally of its bottom portion comprise one half of the wells on the alternate plates and in which the wells including a centrally located drain pipe and an imperforate area disposed adjacent each corner of its bottom portion comprise one half the wells on the remaining plates, the other half of the wells on the alternate plates including a centrally located drain pipe and an imperforate area disposed adjacent each corner of its bottom portion and the other half of the wells on the remaining plates including an imperforate area located centrally of its bottom portion and a drain pipe disposed adjacent each corner of its bottom portion, wells having a centrally disposed drain outlet being positioned above wells having an imperforate area located centrally of its bottom portion and wells having a drain outlet disposed adjacent each corner of its bottom portion being positioned above wells having an imperforate area disposed adjacent each corner of its bottom portion.

References Cited in the file of this patent

UNITED STATES PATENTS

| Number | Name | Date |
|---|---|---|
| 1,594,336 | Mewes et al. | July 27, 1926 |
| 1,677,777 | Houseman | July 17, 1928 |
| 1,748,411 | Cooke | Feb. 25, 1930 |
| 1,796,135 | Alexander | Mar. 10, 1931 |
| 1,808,088 | Urquhart | June 2, 1931 |
| 1,826,521 | Nott | Oct. 6, 1931 |
| 1,850,930 | Heid | Mar. 22, 1932 |
| 1,968,518 | Fraser | July 31, 1934 |
| 2,010,010 | Chillas | Aug. 6, 1935 |
| 2,051,545 | Collins | Aug. 18, 1936 |
| 2,059,044 | Seelig et al. | Oct. 27, 1936 |
| 2,142,446 | Kopp | Jan. 3, 1939 |
| 2,150,498 | Geddes et al. | Mar. 14, 1939 |
| 2,201,949 | Wentworth | May 21, 1940 |
| 2,202,071 | Van Dougen et al. | May 28, 1940 |
| 2,274,041 | Cook et al. | Feb. 24, 1942 |
| 2,281,799 | Quave | May 5, 1942 |
| 2,320,073 | Gibb | May 25, 1943 |
| 2,331,344 | Powers | Oct. 12, 1943 |
| 2,366,958 | Dennis | Jan. 9, 1945 |
| 2,375,409 | Glitsch | May 8, 1945 |
| 2,380,417 | De Baufre | July 31, 1945 |
| 2,409,458 | Van Nuys | Oct. 15, 1946 |
| 2,435,695 | Powers | Feb. 10, 1948 |
| 2,446,534 | Fausek et al. | Aug. 10, 1948 |
| 2,468,903 | Villiger | May 3, 1949 |
| 2,480,093 | Anderson | Aug. 23, 1949 |
| 2,491,726 | Glitsch | Dec. 20, 1949 |
| 2,495,512 | Dorfan | Jan. 24, 1950 |
| 2,565,355 | Cook | Aug. 21, 1951 |

FOREIGN PATENTS

| Number | Country | Date |
|---|---|---|
| 25,507 | Great Britain | Nov. 12, 1906 |

UNITED STATES PATENT OFFICE
CERTIFICATE OF CORRECTION

Patent No. 2,804,292                                              August 27, 1957

Clarence J. Schilling

It is hereby certified that error appears in the printed specification of the above numbered patent requiring correction and that the said Letters Patent should read as corrected below.

Column 4, line 11, strike out "ofodletepgGatfilaDfi a,. T vinsio"; column 5, line 68, after "of" insert -- the --; column 6, line 60, for "higher" read -- high --; column 12, line 40, for "bar" read -- bars --; line 43, after "181" insert -- are --; column 15, line 54, for "pluraliy" read -- plurality --; column 16, line 56, for "Figure" read -- Figures --; line 74, for "liquid" read -- liquids --.

Signed and sealed this 5th day of August 1958.

(SEAL)

Attest:

KARL H. AXLINE
Attesting Officer

ROBERT C. WATSON
Commissioner of Patents